United States Patent [19]
Rikkinen et al.

[11] Patent Number: 6,031,827
[45] Date of Patent: Feb. 29, 2000

[54] METHOD FOR RADIO RESOURCE CONTROL

[75] Inventors: Kari Rikkinen, Oulu; Kalle Ahmavaara; Mikko Rinne, both of Helsinki; Mika Rinne, Espoo, all of Finland

[73] Assignee: Nokia Mobile Phones Limited, Salo, Finland

[21] Appl. No.: 08/802,645

[22] Filed: Feb. 19, 1997

[30] Foreign Application Priority Data

Oct. 25, 1996 [FI] Finland ................................. 964308

[51] Int. Cl.$^7$ .................... H04Q 7/00; H04B 7/216; H04J 1/00; H04J 3/16
[52] U.S. Cl. .................... 370/330; 370/335; 370/347; 370/343; 370/468
[58] Field of Search .................... 370/468, 329, 370/346, 347, 348, 330, 336, 337, 335, 342, 321, 322; 375/202

[56] References Cited

U.S. PATENT DOCUMENTS

| | | | |
|---|---|---|---|
| 5,005,170 | 4/1991 | Nelson | 370/84 |
| 5,128,959 | 7/1992 | Bruckert | 375/1 |
| 5,257,257 | 10/1993 | Chen et al. | 370/18 |
| 5,396,653 | 3/1995 | Kivari et al. | 455/88 |
| 5,430,740 | 7/1995 | Kivari et al. | 371/37.1 |
| 5,513,183 | 4/1996 | Kay et al. | 370/95.3 |
| 5,533,004 | 7/1996 | Jasper et al. | 370/11 |
| 5,742,592 | 4/1998 | Scholefield et al. | 370/329 |
| 5,818,829 | 10/1998 | Raith et al. | 370/347 |

FOREIGN PATENT DOCUMENTS

| | | |
|---|---|---|
| 0399611 A2 | 11/1990 | European Pat. Off. . |
| 0615393 A1 | 9/1994 | European Pat. Off. . |
| 0633671 A2 | 1/1995 | European Pat. Off. . |
| 0670640 A2 | 9/1995 | European Pat. Off. . |
| 2174571 | 11/1986 | United Kingdom . |
| WO 95/12931 | 5/1995 | WIPO . |
| WO 96/10320 | 4/1996 | WIPO . |

OTHER PUBLICATIONS

Electronics Letters, vol. 32, No. 13, Jun. 20, 1996, pp. 1175, 1176, XP000599175, Ikeda T et al., "TDMA Based Adaptive Modulation With Dynamic Channel Assignment (AMDCA) For Large Capacity Voice Transmission in Microcellular Systems".

European Search Report.

*Primary Examiner*—Douglas W. Olms
*Assistant Examiner*—David R Vincent
*Attorney, Agent, or Firm*—Perman & Green, LLP

[57] ABSTRACT

In order to control the use of physical radio resources, the physical radio resources are divided into chronologically consecutive frames (14), so that a frame contains slots (16, 17, 18) of various sizes, which slots represent a given share of the physical radio resources contained in the frame and can be individually allocated to different radio connections. The first dimension of a frame is time and the second dimension can be time, frequency or code. In the direction of the second dimension the slots represent various sizes, and a given first integral number of slots of the first size can be modularly replaced by another integral number of slots of another size. A certain number of consecutive frames form a superframe (19), in which case frames with corresponding locations in consecutive superframes are equal in slot division and allocations, if the data transmission demands do not change. Changes in the state of occupancy of the slots are possible at each superframe. In order to form an uplink connection, the mobile station sends a capacity request, where it indicates the type of requested connection and the demand of resources. In order to form a downlink connection, the base station subsystem sends a paging call, where it indicates the location in the superframe of the slots allocated to the connection. In order to indicate the state of occupancy, the base station subsystem maintains a superframe-size parametrized reservation table.

46 Claims, 15 Drawing Sheets

METHOD FOR RADIO RESOURCE CONTROL

TECHNOLOGICAL FIELD

The invention relates generally to sharing radio resources between various users in a cellular radio system. Particularly the invention relates to sharing radio resources in a system where the users' data transmission needs, both in quality and quantity, change rapidly.

BACKGROUND OF THE INVENTION

At the moment of filing this application, the most general form of mobile personal telecommuication is a second-generation digital cellular radio network; these networks include the European systems GSM (Global system for Mobile telecommunications) and its extension DCS1800 (Digital Communications System at 1800 MHz), the North American (USA) systems IS-136 (Interim Standard 136), IS-95 (Interim Standard 95) and the Japanese system PDC (Personal Digital Cellular). These systems transmit mainly speech, telefaxes and short text messages, as well as digital data at a limited speed, for instance files transmitted between computers. Several third-generation systems are being designed, the aims being world-wide coverage, a large selection of data transmission services and a flexible sharing of capacity, so that a given user may, when desired, transmit and/or receive even a large amount of data at a high speed.

The European Telecommunications Standards Institute ETSI has suggested a third-generation mobile telecommunications system called UMTS (Universal Mobile Telecommunications System). Its aim is a wide operating environment including homes, offices, urban and rural environments as well as stationary and mobile stations. The selection of services is large, and in addition to the currently known mobile telephones, the types of mobile stations include for instance multimedia terminals and multipurpose terminals that mediate telecommunications between the UMTS system and various local systems.

FIG. 1 illustrates an exemplary cell 11 of the UMTS system, provided with a stationary base station subsystem 12 (BSS), within the range of which there exist or move, along with the users, several different mobile stations 13. The base station subsystem may comprise one or several base stations, as well as a base station controller controlling their operation. In between the base station subsystem and the mobile stations, there is a radio connection, for which a given radio frequency range is reserved, and the operation of which is regulated by the specifications of the system. The time and frequency range available for the radio connection together define so-called physical radio resources. One of the biggest challenges of the base station subsystem is to control the use of these physical radio resources so that all terminals located in the cell coverage are at any moment capable of receiving data transmission services of the requested quality, and that adjacent cells interfere with each other as little as possible.

From the prior art systems, there are known several methods for sharing radio resources. In time division multiple access (TDMA), each of the employed transmission and reception frequency bands is divided into time slots, among which the base station subsystem allocates one or several cyclically repeated time slots to the use of a given terminal. In frequency division multiple access (FDMA), the utilised frequency range is divided into very narrow bands, among which the base station subsystem allocates one or several to each terminal. Many current systems apply a combination of these, where each narrow frequency band is further divided into time slots. In coded division multiple access (CDMA), each connection between the mobile station and the base station subsystemobtains a spreading code, whereby the transmitted information is spread randomly within a fairly large frequency range. The codes used within the cell coverage are mutually orthogonal or nearly orthogonal, in which case a receiver that recognises the code may distinguish the desired signal and attenuate other simultaneous signals. In orthogonal frequency division multiplex (OFDM), suited mainly for broadcasting-type services, data is transmitted from the transmitting central station on a wide frequency band, which is divided into equidistant sub-frequencies, and the simultaneous phase shifts of these sub-frequencies create a two dimensional bit flow in the time-frequency space.

As for the technology of packet switched radio networks, there are also known various packet-based connection protocols, where the connection between the mobile station and the base station subsystemis not continuous but proceeds in packages with pauses of varying durations in between. Compared with continuous connection Systems, i.e. with so-called circuit-switched networks, there is achieved the advantage that the radio resources required by a given connection are not unnecessarily occupied when there is a temporary pause in the connection. A drawback is generally a longer data transmission delay, because after each pause, the transmission of a new packet requires the exchange of certain control or signalling messages between the mobile station and the base station. Delays can also be caused by different routing of the packages between transmitter and receiver.

It is typical of third-generation cellular radio networks that for instance in the case of FIG. 1, with some of the terminals 13 it suffices to have a fairly low-capacity radio connection with the base station, but some of them need, at least temporarily, a remarkably larger share of the common radio resources than the others. Low-capacity connections can be for example speech connections, and a high-capacity connection can be for example the loading of an image file in a data network connection via the base station subsystemto the mobile station, or a video image connection during a videophone call. In the prior art, there is not known a method where the base station subsystem could divide the available radio resources in a flexible and dynamic way between the various users.

OBJECT OF THE INVENTION

An object of the present invention is to introduce a method for a flexible and dynamic division of radio resources in the base station subsystem of a cellular radio network.

SUMMARY OF THE INVENTION

The object of the invention is achieved by dividing the radio resources in the base station subsystem—or in a similar arrangement responsible for the division of radio resources—into frames, among which the base station subsystem can allocate, according to the traffic demands of the moment, various sizes of modular, parametrized sections to be used by the different connections. These frames are repeated cyclically so that the repetition sequence contains either a single frame or a group of consecutive frames.

The method of the invention is characterised in that the physical radio resources are chronologically divided into consecutive frames that contain slots with varying data transmission capacities, so that each slot represents a given proportion of the physical resources contained in the frame, and each slot can be separately allocated to the use of a given radio connection.

In the method of the invention, the so-called physical layer of the transmission channel between a first radio station and a second radio station is divided into frames. The exemplary denominations "base station" and "mobile station" are used to distinguish the radio stations from each other throughout this patent application. Each frame may be further divided into smaller units, the size of which is defined by two coordinates or dimensions, which makes the subdivision of a frame conceptually two-dimensional in structure. The first dimension is time; this means that the frame has a given duration in time, which can be further divided into consecutive time slots. In a preferred embodiment of the invention, each frame contains an equal number of time slots, but the usage of the time slots may vary from one frame to another. The second dimension can be time, frequency or code. If also the second dimension is time, each time slot of the frame is further divided into smaller sub-time slots. If the second dimension is frequency, there can be extracted, in each time slot contained by the frame, frequency bands that are narrower than the total allocated frequency band covered by the frame. If the third dimension is code, a given number of mutually orthogonal or nearly orthogonal codes is available during each time slot.

The smallest resource unit to be allocated from one frame is a slot, the size of which is in the first dimension defined by the length of the time slot and in the second dimension by a division unit determined according to the nature of the second dimension. For instance in a time-frequency frame, the size of the slot in the second dimension is the bandwidth of the frequency band employed in each case. One slot is always allocated as a whole to the use of one connection. It is important to notice that in this patent application, a time slot is conceptually a different thing than a slot. A time slot is generally a division unit of a frame in the time dimension. A slot is the unit of physical radio resources that may be allocated to a single connection.

A certain predetermined number of consecutive frames forms the so-called superframe. Because in digital systems various numbers in general are most naturally powers of two, the superframe advantageously contains 1, 2, 4, 8, 16, 32 or 64 frames. The flexibility and dynamic adaptability of the method according to the invention are both due the fact that the slots contained by a given frame are not necessary equal in size, that the slot structure of the frames contained in the superframe is not necessarily similar, and that it is not necessary to allocate an equal number of slots from a frame or superframe to each connection. The slot structure and the reservation of slots for the use of various connections can change superframe by superframe. On the other hand, if the data transmission need does not change, the first frame in a given superframe has a similar slot structure as the first frame of the preceding superframe, the second frame is similar to the second frame of the preceding superframe, and so forth. The word superframe is naturally only an exemplary denomination to a concept that may represent one or more consecutive frames.

In an uplink data transmission, i.e transmission that proceeds from the mobile stations to the base station subsystem, the mobile stations need some kind of arrangement by which they can reserve data transmission capacity for use. In a preferred embodiment of the invention, each uplink superframe contains random access slots, during which the mobile stations can freely send packet-shaped capacity requests. Respectively, downlink superframes contain allocation grant slots, where the base station subsystem notifies the granted allocations. Granting takes place on the basis of capacity requests received successfully by the base station subsystem and according to the priority regulations set for different types of connections and the prevailing traffic load. The base station subsystem advantageously maintains a superframe-size reservation table, where it manages the allocations so that the available radio resources are utilised in an optimal fashion.

In a downlink data transmission the base station subsystem allocates data transmission capacity similarly according to the priority regulations set for different types of connections and the prevailing traffic load. It notifies the downlink allocations preferably in the same paging messages that it uses to inform the mobile stations about incoming downlink transmission requests. Once a mobile station has acknowledged the correct reception of a paging message, the downlink transmission may begin using the allocated transmission capacity.

BRIEF DESCRIPTION OF DRAWINGS

The invention is described in more detail below, with reference to the preferred embodiments presented as examples and to the appended drawings, where

FIG. 1 was already referred to above, in the description of the prior art; therefore we shall mainly refer to FIGS. 2a–11 in the description of the invention and its preferred embodiments below. Like numbers for like parts are used in the drawings.

DISCUSSION OF PREFERRED EMBODIMENTS

Figure 1:
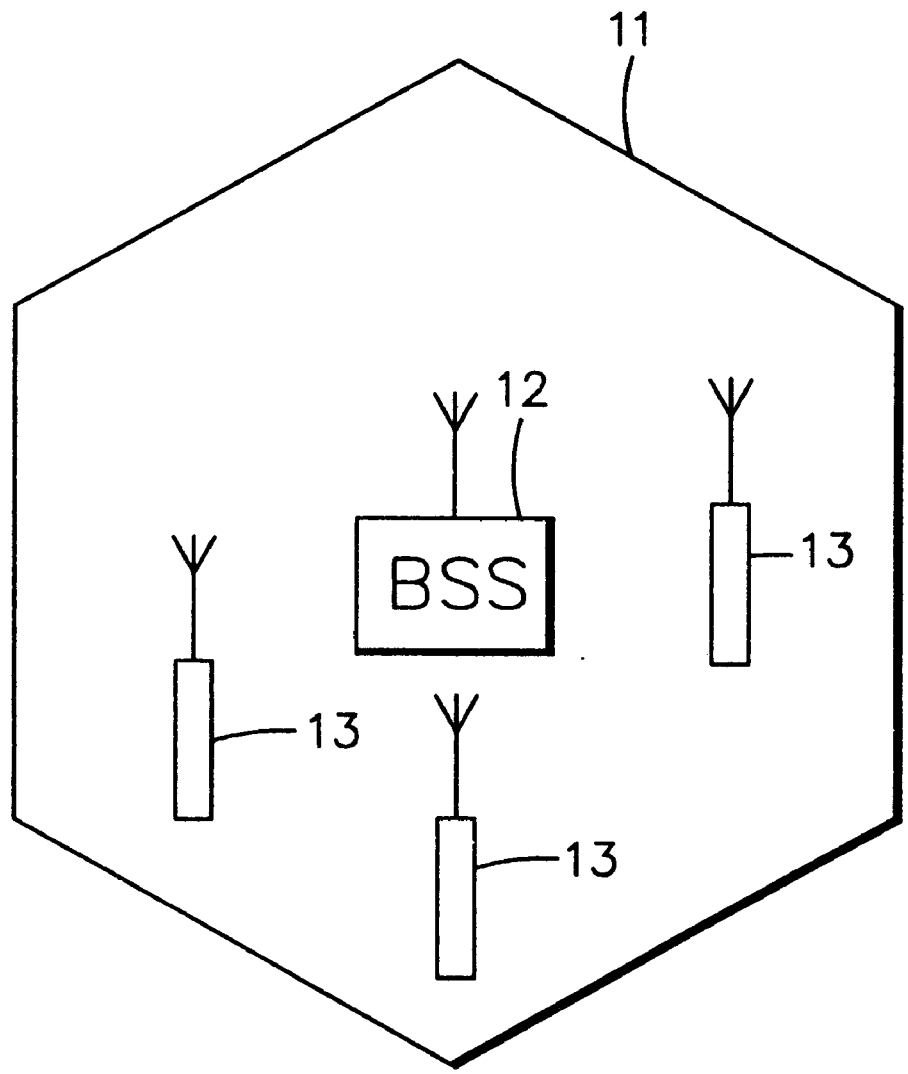
FIG. 1 illustrates a known cell in a cellular system.
Figure 2A:
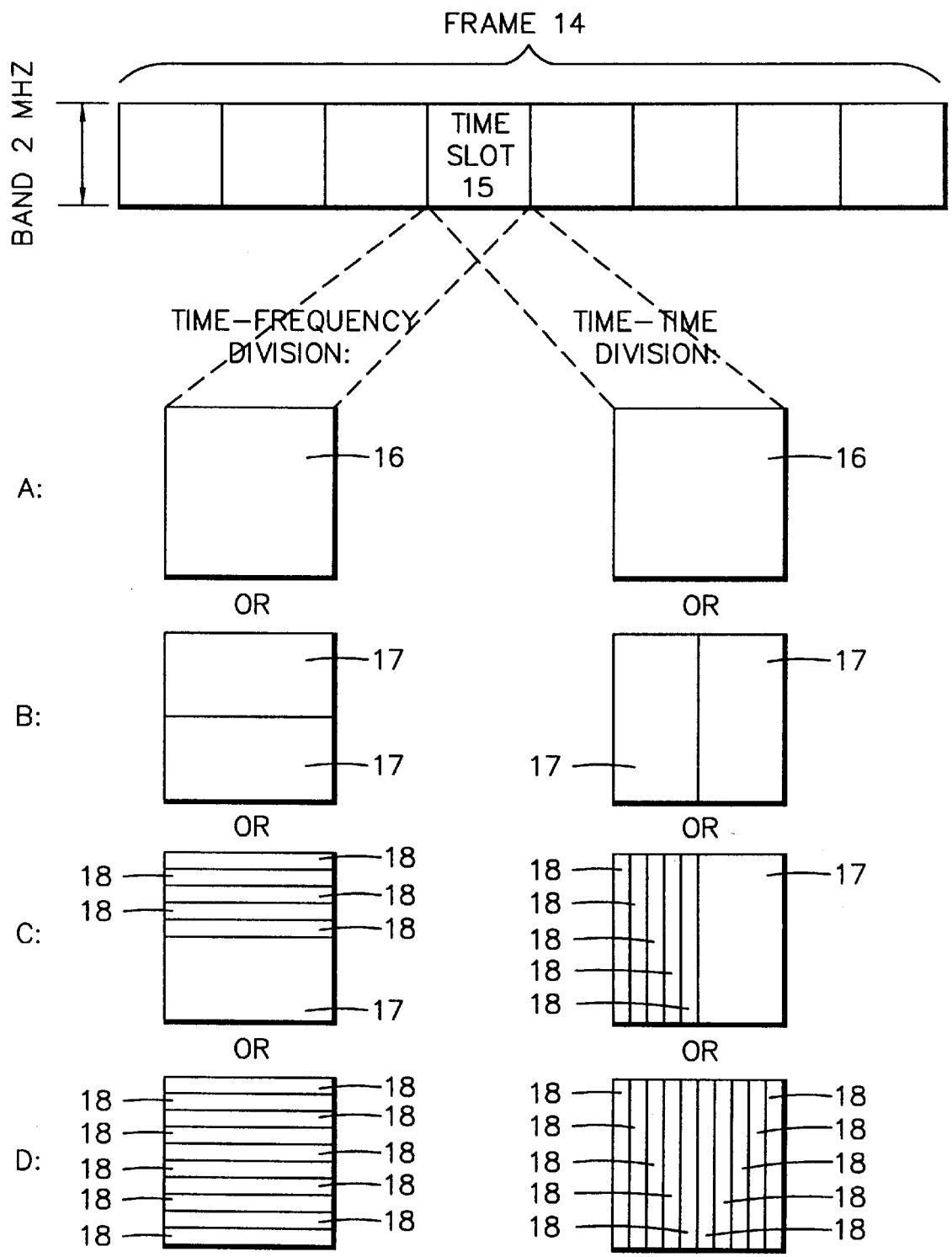
FIG. 2a illustrates some structural elements of a frame according to the invention.

FIG. 2a illustrates a two-dimensional frame 14 according to a preferred embodiment of the invention. In the above description it was maintained that the first dimension of the frame is time and the second dimension can be either time, frequency or code. In the case of FIG. 2a, the second dimension of the frame 14 is frequency or time. The size of the frame in the direction of both dimensions must be chosen so that it is compatible with other specifications set for the system. In this example, the length of the frame in the time direction is about 4.615 milliseconds, and it is divided, in the time direction, into eight time slots, in which case the length of one time slot 15 is about 0.577 ms. The frame width in the frequency direction is about 2 MHz.

The smallest uniform structural elements of the frame, i.e. the slots, are various subdivisions of a time slot 15. In the lower left portion of FIG. 2a, time-frequency division is applied, whereby the chronological length of each slot is the same as that of a time slot, but its width in the frequency direction may be 200 kHz, 1 MHz or 2 MHz. Reference number 16 denotes a large, 0.577 ms×2 MHz slot, reference number 17 denotes a medium-sized, 0.577 ms×1 MHz slot, and reference number 18 denotes a small, 0.577 ms×200 kHz slot. In the lower right portion of the Figure, time-time division is applied, whereby each slot employs the whole 2 MHz bandwidth of the system but its chronological duration may be 1/1, 1/2, or 1/10 of the length of a time slot. Reference number 16 denotes again a large, 0.577 ms×2 MHz slot, reference number 17 denotes a medium-sized, 0.2885 ms×2 MHz slot and reference number 18 denotes a small, 0.0577 ms×2 MHz slot. In those divisions in which five small slots share a time slot with one medium-sized slot (row C: of the division examples), it is naturally possible to present a mirror image alternative (for example a time slot which begins with a medium-sized slot and ends with five small slots).

According to another suggestion, the number of different slot size categories is four, and their relative sizes are such that the slot of the largest size category would correspond to two slots of the second largest size category, four slots of the third largest size category and eight slots of the smallest size category. Also other arrangements for the relative slot sizes are possible.

A carrier wave solution, where one frame can contain several elements with different widths on the frequency band, is called a parallel multicarrier structure. The base station subsystem may change the frame structure, so that it replaces one large slot by two medium-sized, ten small or one medium-sized plus five small slots or vice versa, or so that it replaces one medium-sized slot by five small slots or vice versa. This property is called the modularity of the frame: a given slot or slot group forms a module (like the group of five small slots 18 on row C: of the division examples), which can in the corresponding time slot contained in some later frame be replaced by a different module (like a single medium-sized slot 17 on row B: of the division examples), so that the rest of the contents of the frame are not changed, and the available bandwidth is always optimally utilised. The invention does not as such limit neither the number of time slots contained in the frame nor the widths of allowed carrier bands, but in order to maintain modularity, it is particularly advantageous that the slots are each other's integral multiples with respect to their dimensions. For instance three 250 kHz wide slots in time-frequency division could not be modularly replaced by 450 kHz wide slots, but only one 450 kHz slot would fit in the space left by the three narrower slots, and 300 kHz of the bandwidth would remain unused.

The invention does not require that the frame would occupy a continuous range of frequencies (2 MHz in FIG. 2a). It is possible to define a frame so that it covers two or more separate frequency bands. Even a single slot may cover two or more separate frequency bands, which naturally requires the corresponding transceiver to have multiple operation capabilities, i.e. in reception the capability of receiving on at least two different reception frequency bands simultaneously and combining the received information correctly, and in transmission the capability of dividing information into at least two separate transmitter branches and transmitting it simultaneously on at least two different transmission frequency bands.

Figure 2B:
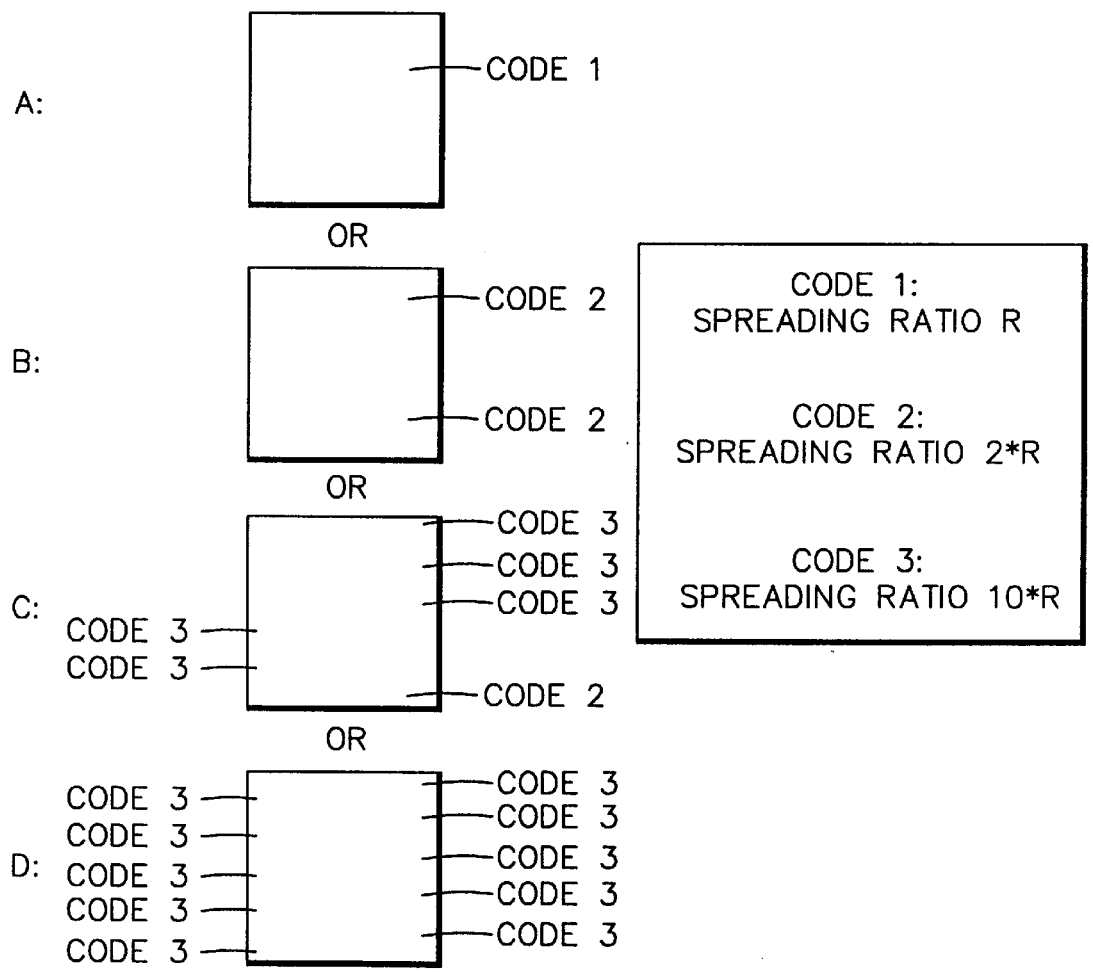
FIG. 2b illustrates a variation of FIG. 2b.

FIG. 2b illustrates a CDMA alternative to the division of time slots according to FIG. 2a. During each time slot 15 there may be a different number of allowed spreading codes, with different spreading ratios. The spreading ratio is a characteristic feature of a spreading code and from the viewpoint of resource sharing it defines how much physical radio resources must be allocated to a single connection. The bigger the spreading ratio of a spreading code used in a connection, the lower the bit rate in that connection, and correspondingly the larger the number of possible simultaneous connections during a given period of time using a given bandwidth. In the example of FIG. 2b, three types of spreading codes are available. The Code 1 type spreading codes have such a small spreading ratio R that information that is transmitted with a Code 1 type spreading code fills the capacity of a whole time slot (row A:). The spreading ratio of Code 2 type spreading codes is 2*R (i.e. twice that of Code 1), so two connections using orthogonal or nearly orthogonal Code 2 type spreading codes may exist simultaneously in a single time slot (row B). The Code 3 type spreading codes have a spreading ratio 10*R (i.e. ten times that of Code 1), so different combinations of orthogonal or nearly orthogonal spreading codes may exist simultaneously; on row C. the time slot accommodates five connections with Code 3 type spreading codes and one with a Code 2 type spreading code, and on row D: there are ten simultaneous connections with Code 3 type spreading codes. A simple comparison between FIGS. 2a and 2b shows that the time-code division may be interpreted to define slots in a fashion that is analogous to the use of time-frequency or time-time-division.

Apart from the slot dimensions, the capacity of a slot, i.e. the amount of data that can be transmitted in one slot, depends on the modulation and error protection methods used in the coding of the data, as well as of the rest of the signal structure in the slot. In the time-frequency arrangement according to FIG. 2a, where the allowed bandwidths are 200 kHz, 1 MHz and 2 MHz, it has been found advantageous to use, on the two narrower bandwidths (200 kHz and 1 MHz) a binary-offset QAM (B-O-QAM, Binary Offset Quadrature Amplitude Modulation) and on the widest bandwidth (2 MHz) a quaternary offset QAM (Q-O-QAM, Quaternary Offset Quadrature Amplitude Modulation). Other modulation methods are also possible; they are as such known to the person skilled in the art.

Figure 3:
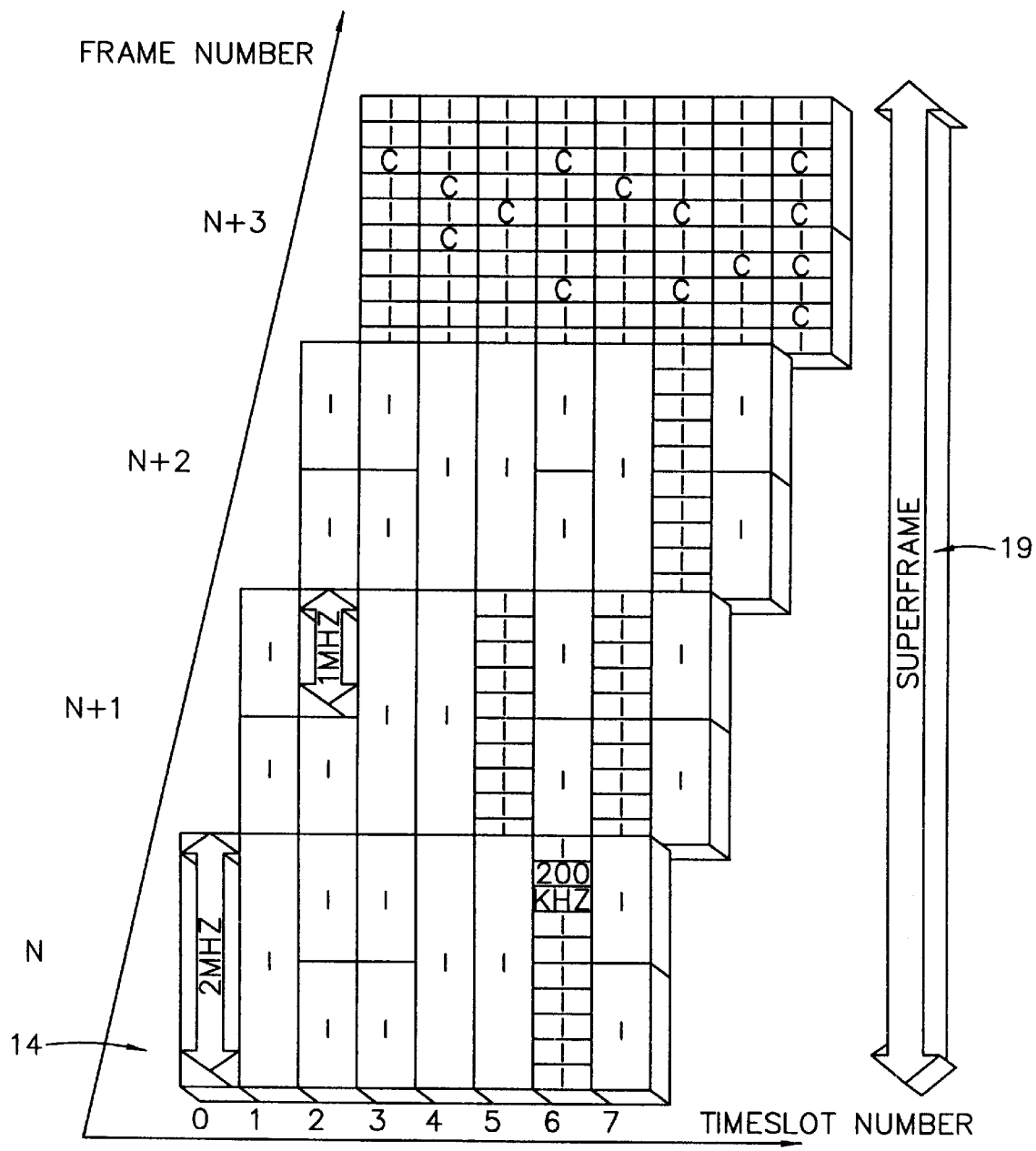
FIG. 3 illustrates a superframe according to a preferred embodiment of the invention.

FIG. 3 illustrates a superframe according to a preferred embodiment of the invention. It was already pointed out that the invention does not limit the number of consecutive frames contained in the superframe, but advantageous numbers are powers of two. At its shortest, a superframe may consist of only one frame. In the case of FIG. 3, the superframe 19 contains four chronologically consecutive frames 14. Here the frames have consecutive numbers, so that the number of the first frame is described by letter N representing a non-negative integral, the next frame is N+1, the next N+2 and the number of the last frame in the superframe is N+3. The time slots of the frames are also numbered with consecutive non-negative integrals, so that the first time slot in each frame is number 0, and the last time slot is number 7. The drawing also illustrates, by way of example, the division of the slots into payload slots and control data slots. Slots containing payload information, i.e. transmittable data proper, are marked with letter I (Information), and the slots containing control data, i.e. signalling data, are marked with letter C (Control).

The control data slots form one or several logic control channels, which are available for instance for transmitting messages controlling the starting, maintaining or ending of a connection, for defining the need to change base stations and for exchanging commands and measurements relating to the transmission power and the power-saving mode of the mobile stations between the base station subsystem and the mobile stations. It is advantageous to place the control slots in a certain relatively compact portion of each frame which contains control slots, because this way the rest of the frame may be very flexibly allocated in different modular slot combinations. If the control slots would be scattered all over the frame structure, only a limited selection of allocatable slots would fit between them.

According to the preferred embodiment of the invention, the base station subsystem (or a corresponding arrangement responsible for the division of radio resources) maintains a parametrized reservation table, which indicates the size and state of occupancy of each slot, as well as other possible parameters concerning the slot. Changes in the slot structure of the frames 14 and/or in the allocation of slots for the use of given connections take place in between the superframes, i.e. the reservation table remains valid for the duration of one superframe at a time. In order to ensure an optimal operation, the base station subsystem must have a reservation table routine, which maintains the reservation table according to given evaluation criteria. Among such important criteria that the reservation table routine takes into consideration before granting access to a new connection are for instance the traffic load, the type of information contained in the new connection (for example speech, video, data), the priority defined on the basis of the new connection (for example ordinary call, emergency call), the general power level of the traffic load as well as the type of the data transmission connection (for example realtime, non-realtime). Moreover, it is possible to define more sophisticated criteria, such as the susceptibility to interference of a given slot, and the transmission power required by the slot.

If a certain base station takes into consideration the reservation tables of the surrounding base stations, too, it may in its own reservation table allocate the slots according to the power level and switching type of the connection. The former means that mobile stations applying a high power level and a low power level have their own allocated slots, which are located in the reservation tables of adjacent base stations, in optimal locations with respect to the total interference of the system. The latter means that circuit-switched and packet-switched connections have their own slots located in the reservation tables of adjacent base stations in optimal locations with respect to the total interference of the system. Optimality is defined so that all users suffer as little as possible from the noise signals of other users. If the slots are allocated for instance according to the power level, the first base station grants low-power users (those located near the first base station) such slots, during which in the second base station there is a connection of a high-power user (one located far from the second base station).

Previously known slot allocation methods are usually sequential (of 8 available slots, for example slot number 0 is allocated first, then slot 1 and so on; or slot number 0 is allocated first, then slots 2, 4, and 6 in this order, then slots 1, 3, 5, and 7) or random. In connection with the present invention it has been found advantageous to use a slot allocation method that takes into consideration the different evaluation parameters that may be presented to describe each slot. The base station subsystem may measure the level of noise in each slot and arrange the free and allocatable slots according to their quality, i.e. noise level. If a new slot request indicates that the desired new connection should have very tight realtime requirements with only limited retransmission possibilities, the base station subsystem will give it a very high-quality slot with low noise levels. A non-realtime connection with good retransmission tolerance could get a lower-quality slot, in order to keep the best slots free for possible future realtime connection requests. The size of a slot is important: if there are both small and large slots free and available in a frame, and a new slot request indicates only a small need of resources, it is advisable to allocate an existing small slot for it even if it could getter a better quality slot through replacement of a larger slot with a group of smaller slots in a modular fashion and allocation of one of those.

The representation of the slot allocation method in the base station subsystem may be an allocation equation or a logical algorithm (conclusion chain). The former means that the base station gives different calculational weights to the relevant factors in consideration (noise level, realtime service requirements, need for splitting of large slots, estimated power level, etc.) and calculates a result that points at a certain slot. The latter means that the base station subsystem maintains a set of candidate slots and evaluates them one at a time to find out which one would suit best to the newly requested connection.

Figure 11:
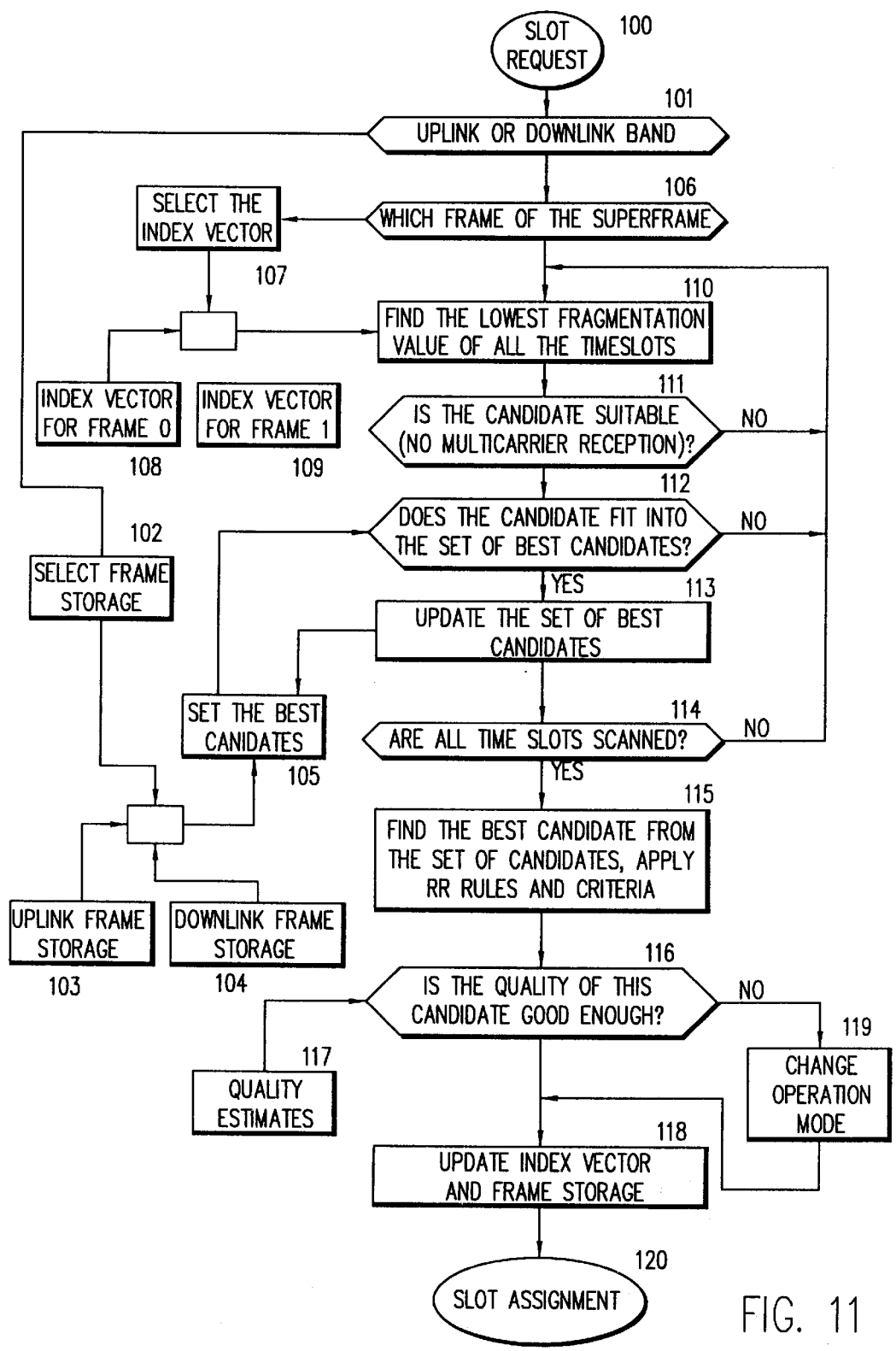
FIG. 11 illustrates an advantageous algorithm for slot allocation.

FIG. 11 illustrates an exemplary logical algorithm that the base station subsystem may use to determine, which slot it will allocate to a given new connection. Operation begins with a slot request 100 which may come either from the network side (downlink slot request) or from the mobile station's side (uplink slot request). In block 101 the base station subsystem checks, which frame storage (uplink or downlink) it should choose. The actual selection of a storage (reservation table) is done as a background process in blocks 102, 103, and 104, and the algorithm proceeds to block 106. Here a frame selection process 107, 108, 109 similar to the frame storage selection is initiated. In the Figure we suppose that each superframe consists of two frames.

In block 110 the base station subsystem starts the evaluation process from the time slot that has the lowest fragmentation value, i.e. that contains the largest slots. In block 111 it rejects all timeslots where the new connection would result in multicarrier allocation. In block 112 it checks, whether there are any other factors that would prevent the use of the time slot (too small slot capacity, preset transmission power limitations, unacceptably high noise levels etc.) and if not, it updates the set of candidate time slots. Block 114 causes a repetition of steps 110, 111, 112, 113, and potentially 105 until all timeslots have been scanned. In block 115 the base station finds the best candidate time slot by applying certain radio resource management rules and selection criteria. There may be for example two best candidates with equally low interference, and the base station subsystem must examine, whether the estimated power requirement for the new connection agrees with certain preset power and noise limitations in each slot and whether choosing of any of the best candidates would imply calculational penalty in the form or splitting a large slot into smaller ones.

After having made the selection in block 115, the base station subsystem additionally checks in block 116, whether the calculated quality estimates 117 indicate a sufficiently high transmission quality. Normally the procedure continues to block 118, but it may happen that even the best candidate slot will not offer enough quality. In such cases the base station subsystem branches into block 119, where it initiates a possible operation mode change to enhance the transmission quality. The procedure ends in a slot assignment decision 120.

In the method according to the invention, the sharing of radio resources takes place in similar fashion both as regards realtime and non-realtime services: the base station subsystem (or a corresponding arrangement responsible for the division of radio resources) allocates slots for each service according to their needs. Similar control messages and mechanisms regulate the distribution of radio resources in both cases; only the detailed content of the control messages and some principles of allocation and deallocation are somewhat different depending on the type of service in question. Data transmission over radio path during an already created connection is somewhat different depending on whether the service in question is realtime or non-realtime. Applications requiring realtime or nearly realtime service are for instance speech transmission in packets and the video connection required by a videophone. In a simulation of the method according to the invention it was presupposed that in the transmission of speech, in between the base station subsystem and the mobile station there is achieved a bit error ratio (BER) $10^{-3}$, when the longest allowed data transmission delay is 30 Ms. In a video connection required by a videophone, the corresponding values are $10^{-6}$ and 100 ms, where the longer delay is caused by the time interleaving of the transmitted data. These services apply a forward error correction (FEC) type error correction and a radio resource reservation protocol to be explained in more detail below. A non-realtime service is for instance file transmission in an ordinary Internet connection. It applies packet-type data transmission and an ARQ-type error correction protocol (automatic repeat on request).

Figure 4A:
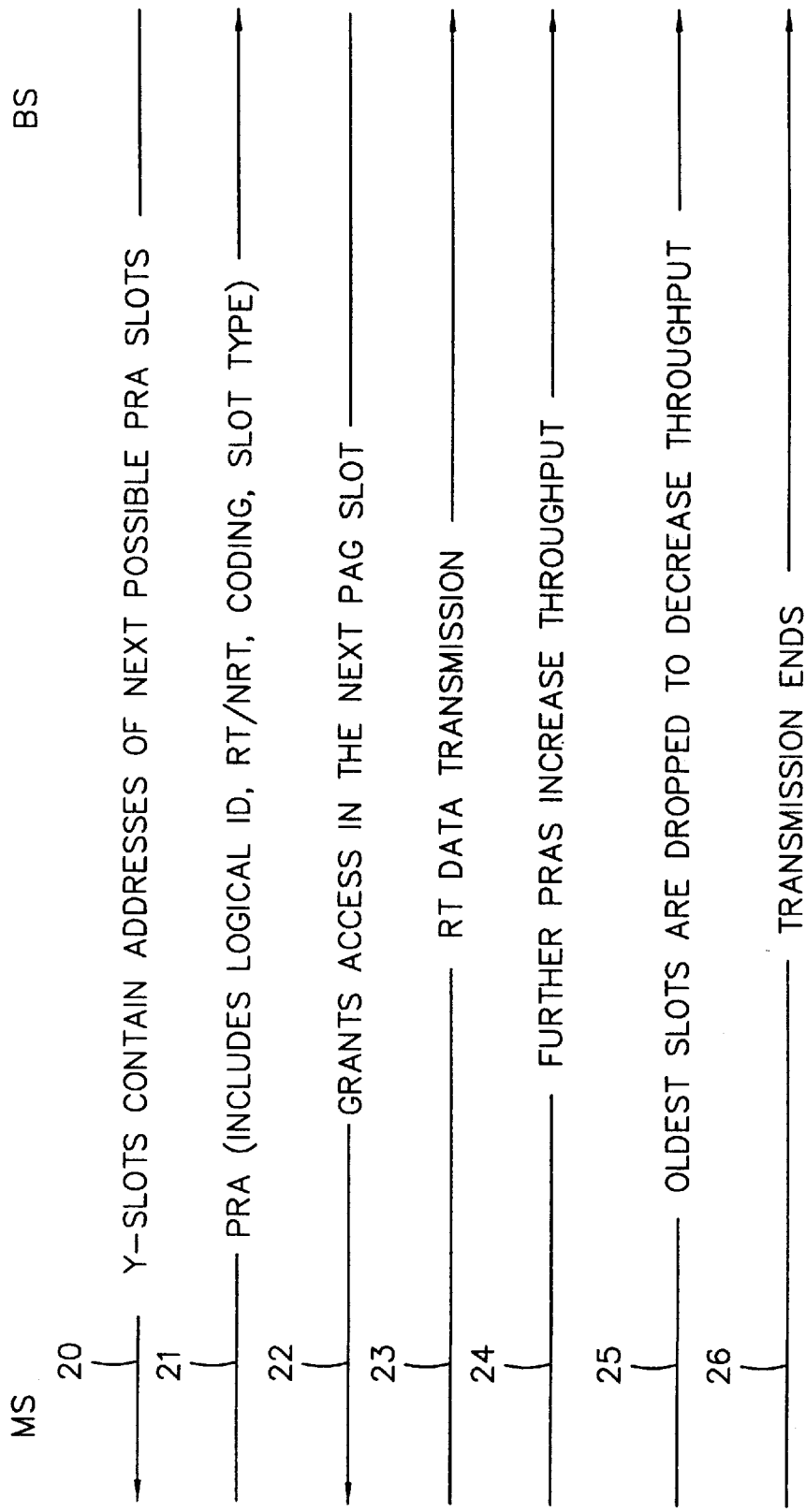
FIG. 4a illustrates an uplink realtime data transmission according to a preferred embodiment of the invention.
Figure 4B:
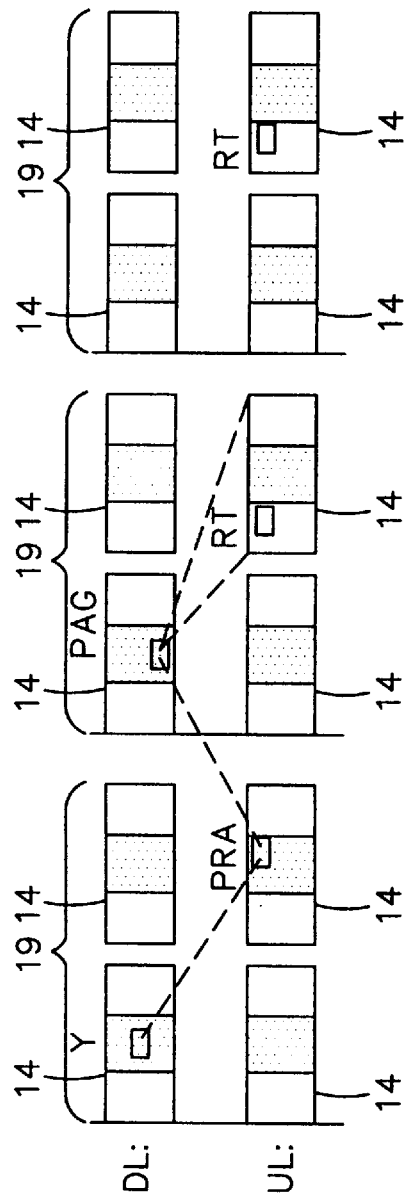
FIG. 4b illustrates a timing aspect of the messages of FIG. 4a, FIG. 5a illustrates a downlink realtime data transmission according to a preferred embodiment of the invention.

We shall next observe realtime uplink data transmission in an ordinary case, with reference to FIGS. 4a and 4b. The arrows of the FIG. 4a represent data transmission between a base station (BS) and a mobile station (MS) in chronological order so that time in the drawing passes from top to bottom. Certain superframes transmitted by the base station contain so-called Y slots, where the base station notifies when in the uplink direction there are next found PRA (packet random access) slots, i.e. such points in the uplink superframe where the mobile stations can send capacity requests. Arrow 20 represents the data transmitted in an Y slot of a given downlink superframe concerning the location of the next PRA slots. If the PRA slots would have a constant location in each uplink frame or superframe, the base station would not need to announce their location in an Y slot, but it adds flexibility to the system to reserve the base station subsystem the possibility of placing the PRA slots in the most suitable way and to change their location between superframes.

In one of the successive PRA slots the mobile station transmits, according to arrow 21, a PRA message where it identifies itself and informs what type of connection is requested (realtime, coding, slot type etc. factors). Because there is no coordination whatsoever between different mobile stations, it may happen that several mobile stations transmit a PRA message simultaneously. In that case one at the most is received. However, in FIG. 4a it is assumed that the PRA message according to arrow 21 is received, in which case in the PAG (packet access grant) slot of the next downlink frame the base station notifies, according to arrow 22, that a given uplink slot or slots are granted for the mobile station. At the same time it informs the location of the granted slot (slots) in the uplink superframe. In the packet access protocols of the prior art the requesting station generally obtains as its radio resource that time slot or other corresponding resource point where it transmitted a successful capacity request. According to the present invention, the slot (or slots) allocated to the connection can be located anywhere within the scope of the next uplink superframes.

When the mobile station has received information of the granted radio resources, it starts data transmission according to arrow 23. During the connection there may arise a situation where the mobile station wants to increase the amount of radio resources it has available. In that case it reserves further slots according to arrow 24, by means of the same procedure that was explained above, i.e. by transmitting a capacity request where it indicates what size and type the new slot should be. It may also happen that during the connection, the data transmission demand of the mobile station decreases, and it wishes to reduce the employed radio resources. Now it ends transmission in given slots according to arrow 25, in which case the base station can allocate the released slots to the use of other connections. Arrow 26 represents a message whereby the mobile station ends transmission.

FIG. 4b serves to clarify the relation of some the abovementioned messages to the frame and superframe timing. Here we assume that there are two frames 14 in each superframe 19. We further assume that the downlink (DL) direction transmission occurs simultaneously with the corresponding uplink (UL) direction transmnission, the two being separated from each other through for example Frequency Division Duplexing (FDD), i.e. placing them on different frequency bands. Still further, we assume that in the middle of each frame 14 there is a range of control slots that appear shaded in FIG. 4b. It is advantageous to place the control slot ranges coincidentally in time in both downlink and uplink directions, because it will prevent the loss of important control information due to simultaneous traffic transmission. Taken the other way around, it will also prevent the loss of any traffic transmission opportunities due to control information reading. The chronological order of the frames in FIG. 4b is from left to right.

The mobile station listens to the downlink transmission DL and finds the slot addresses of the next available PRA slots in a message that the base station transmits in a Y slot. These available PRA slots are situated in the second frame of the leftmost superframe in FIG. 4b. The dashed line represents a logical connection between the slots, in other words it shows that in the Figure the message sent in a certain Y slot governs the use of the PRA slots in the following complete UL frame. The mobile station uses a PRA slot to transmit a PRA message to the base station. Taken that the attempt is successful, the base station transmits a PAG message in a PAG slot of the next complete DL frame. The PAG message tells the mobile station to use a certain slot (or certain slots) RT from the next complete UL frame for the desired transmission carrying real time traffic. The dashed lines from the PAG slot to the next complete UL frame show that the granted UL slot may be anywhere in the frame. The transmission continues in the same slot until the data source is exhausted or the base stations sends a separate RT uplink channel update command (not shown in FIG. 4b).

Figure 5B:
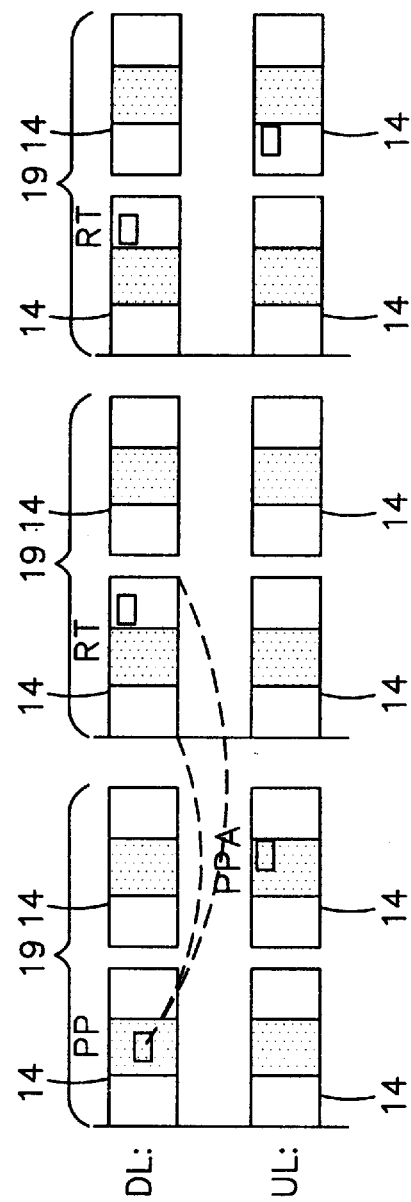
FIG. 5b illustrates a timing aspect of the messages of FIG. 5a, FIG. 6a illustrates an uplink non-realtime data transmission according to a preferred embodiment of the invention.
Figure 5A:
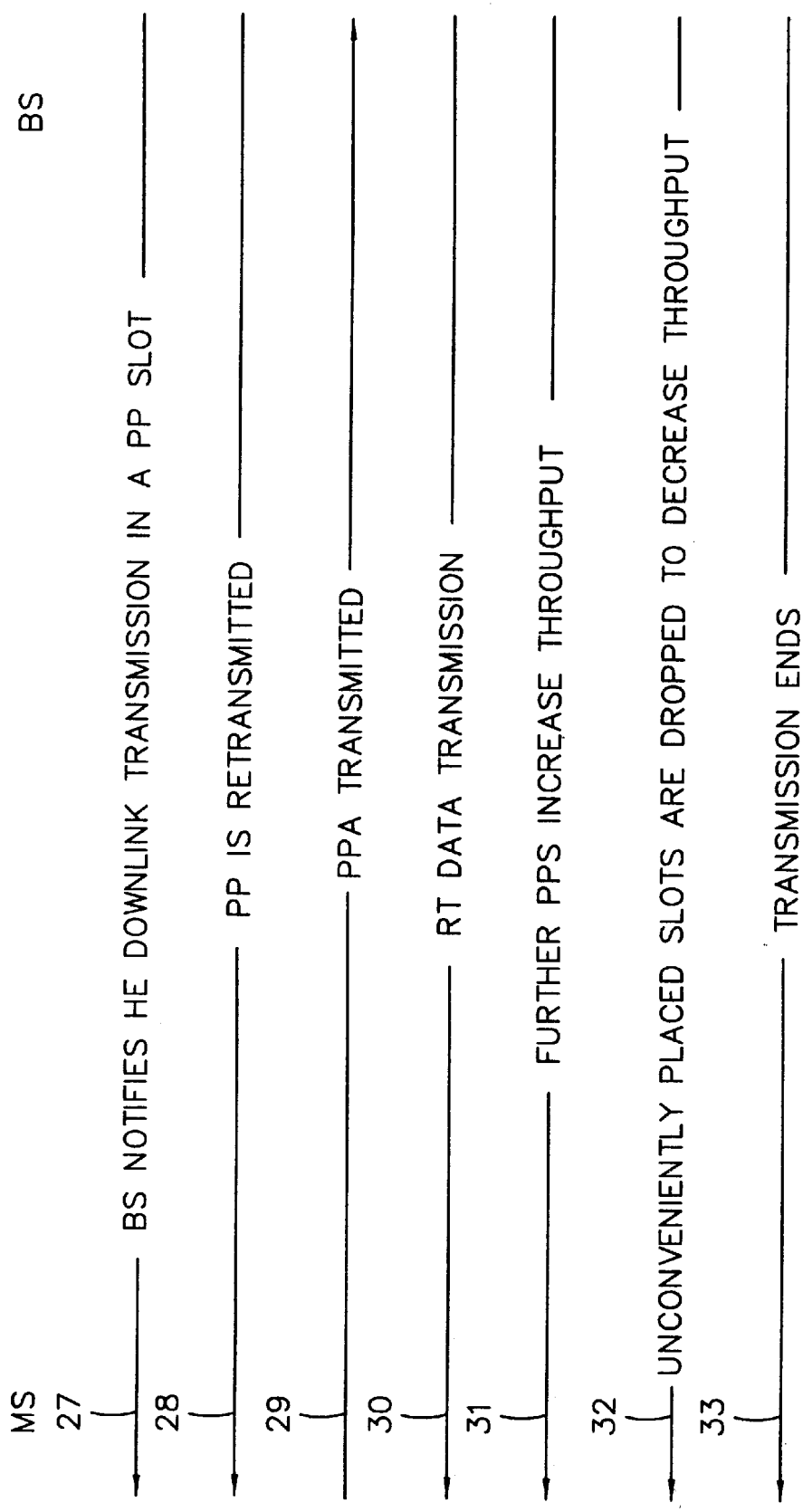

A downlink realtime data transmission takes place according to FIGS. 5a and 5b. A separate slot capacity request is not needed, because the base station subsystem itself maintains the reservation table for the slots and is thus able to direct downlink data transmission to a suitable slot. The message that tells the location of the chosen slot(s) to the mobile station can be transmitted to the mobile station through packet paging (PP) channels, at least one of which is read by each active mobile station. The repetition of the PP message in the packet paging channel, illustrated by arrows 27 and 2. means that the base station transmits a PP message until the mobile station answers (or until a given time limit is surpassed). The mobile station that has received the transmitted PP message echoes, according to arrow 29, the PP message back to the base station as a packet paging acknowledgement (PPA). The base station starts transmission 30 after receiving, intermediated by the PPA, confirmation that the call was received. The resource demands of downlink data transmission can also change during the connection, in which case the base station subsystem allocates more slots to the connection (when resource demand grows) 31 or releases part of the slots (when resource demand decreases) 32. Notification of the changes is transmitted to the mobile station advantageously through packet paging. Arrow 33 illustrates the ending of the transmission.

FIG. 5b clarifies the relation of PP and PPA messages and downlink realtime data transmissions to the frame and superframe timing in an embodiment where we again assume simultaneous FDD uplink and downlink transmission with two frames 14 per superframe 19. After the base station has transmitted a PP message, the first acknowledging chance for the mobile station is in the PPA slots of the next complete UL frame. After receiving the PPA acknowledgement message the base station may start the realtime DL data transmission in the next complete DL frame. It continues the realtime DL data transmission in the same slot in each following DL superframe, until the data source becomes exhausted (exhaustion not illustrated in the Figure), which the mobile station detects when it finds that the slot is empty.

Several simultaneous connections requiring realtime service may exist, in between a given mobile station and base station, both in the uplink aid downlink direction. Simultaneous connections are also called parallel connections. According to a preferred embodiment, the mobile station has a given temporary logic identifier which distinguishes it among other mobile stations communicating with the same base station subsystem. The length of this identifier can be for instance 12 bits. In order to distinguish between parallel connections, there may be used a short (for instance 2-bit) additional identifier. When the mobile station wishes, during a given connection, to start a parallel realtime connection, it sends the base station subsystem a capacity request where it notifies its temporary logic identifier as well as its additional identifier with a value different than the value of the additional identifier describing the preceding ongoing realtime connection. Respectively, the base station subsystem may start a new downlink parallel, realtime connection by transmitting a PP message where it includes the logic identifier of the mobile station for which the message is intended, plus an additional identifier with a value different than the values of additional identifiers describing already ongoing realtime connections. On the basis of the additional identifier, each receiving station knows whether the transmitting station wishes to increase the capacity of some ongoing realtime connection or to start a new parallel connection.

Figure 6A:
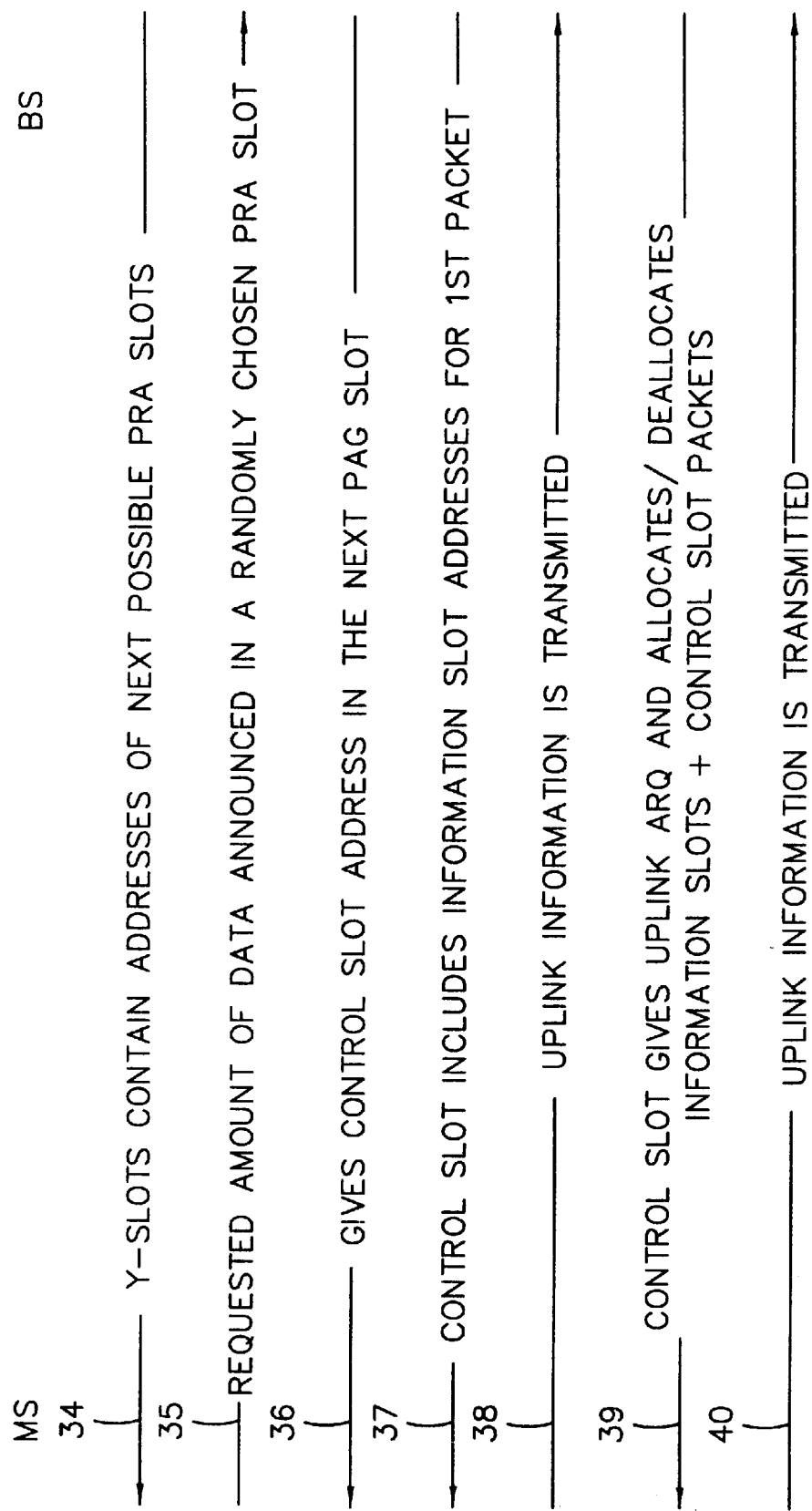
FIG. 6b illustrates a timing aspect of the messages of FIG. 6a, FIG. 7a illustrates a downlink non-realtime data transmission according to a preferred embodiment of the invention.
Figure 6B:
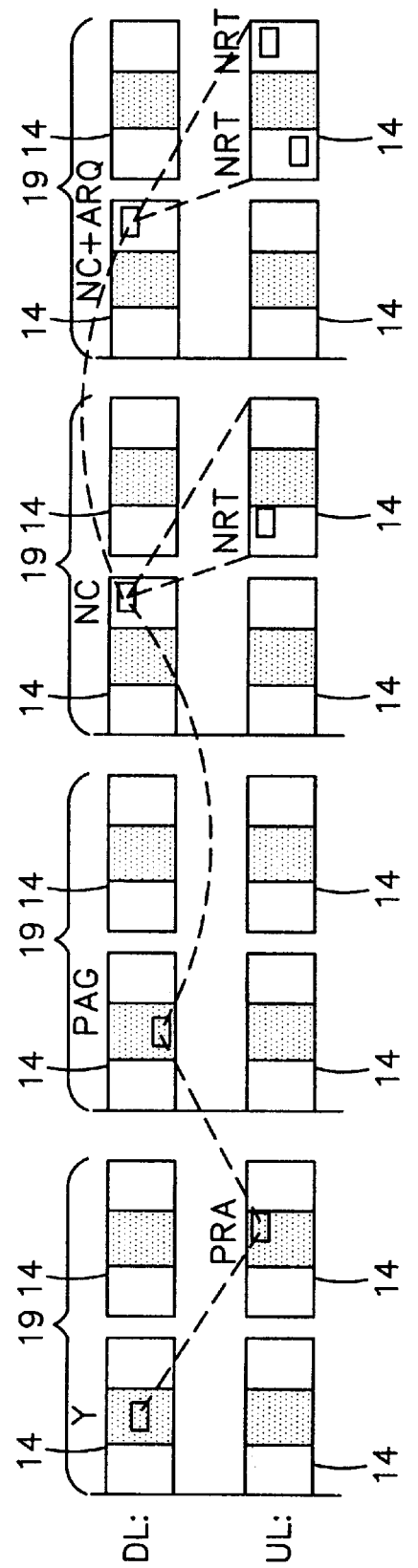

FIGS. 6a and 6b illustrate a non-realtime uplink data transmission in a normal case. Arrow 34 corresponds to arrow 20 in FIG. 4a, i.e. it represents the data concerning the location of the next PRA slots transmitted in the Y slot of a given downlink superframe. In one of the successive PRA slots, the mobile station transmits, according to arrow 35, a PRA message where it identifies itself and notifies how much non-realtime data it wishes to transmit. The amount of data can be given for instance in bytes. In the next PAG slot, the base station notifies, according to arrow 36, what is the location of the control slot reserved as the uplink-direction control channel in the downlink superframe. In the next control slot, the base station transmits, according to arrow 37, the locations in the uplink superframe of the first slots reserved for the connection. In these slots, the mobile station transmits uplink data according to arrow 38. The uplink slots are grouped for instance so that 16 slots form a group. A control message according to arrow 37 has transmitted for the mobile station information of the location of these 16 slots. When the mobile station has transmitted 16 slotted messages, it receives, according to arrow 39, in the next control slot from the base station subsystem a response, where the base station informs how the data was received in the slots of the first group. If the base station has found fault in some slots, the mobile station must retransmit the data contained in these slots. The control message illustrated by arrow 39 also contains information of the location of the slots belonging to the next group, in which case uplink transmission continues in these slots according to arrow 40. Transmission ends when the mobile station has transmitted all of the desired information.

In the above cases, the realtime service of FIG. 4a, and in the non-realtime service of FIG. 6a, the interpretation of the reservation message is different. In the realtime service, there is reserved a given radio resource (slot) for continuous use from consecutive superframes. This means the same as the reservation of a given transmission rate (x bits/s) for the use of the connection. In the case of a non-realtime service, the resources are reserved for the transmission of a given amount of bits or bytes, in which case the data transmission rate need not be constant. If there are a lot of radio resources available, the base station subsystem may, in the control messages represented by arrows 37 and 39, grant for the mobile station slots that are very near to each other. If the rest of the traffic load of the base station is heavy, or if it grows during the non-realtime connection, each superframe contains less free slots, and the control messages described by arrows 37 and 39 grant for the mobile station slots that are located further away from each other in the data flow.

FIG. 6b illustrates the timing in the setup phase of a non-realtime uplink connection. The graphical conventions are the same as in FIGS. 4b and 5b. The operation begins when the mobile station finds the slot address of the next available PRA slot(s) in a message that was transmitted in a Y slot from the base station. The mobile station sends a PRA message, which is here supposed to reach the base station at the first attempt. In the next complete downlink frame containing PAG slot(s) the base station sends a PAG message that identifies an NRT control slot (NC) from the following superframe. In the first NC slot the base station transmits a message in which it gives an address for a downlink ARQ slot as well as the addresses for the first granted uplink NRT traffic slots. The first one(s) of the granted uplink NRT Traffic slots may be in the next complete uplink frame at earliest. The mobile station starts transmission in the allocated NRT traffic slots and the base station acknowledges the transmissions with ARQ messages and grants further uplink NRT traffic slots in the following NC slots. This continues until the total amount of uplink NRT data has been sent.

Figure 7A:
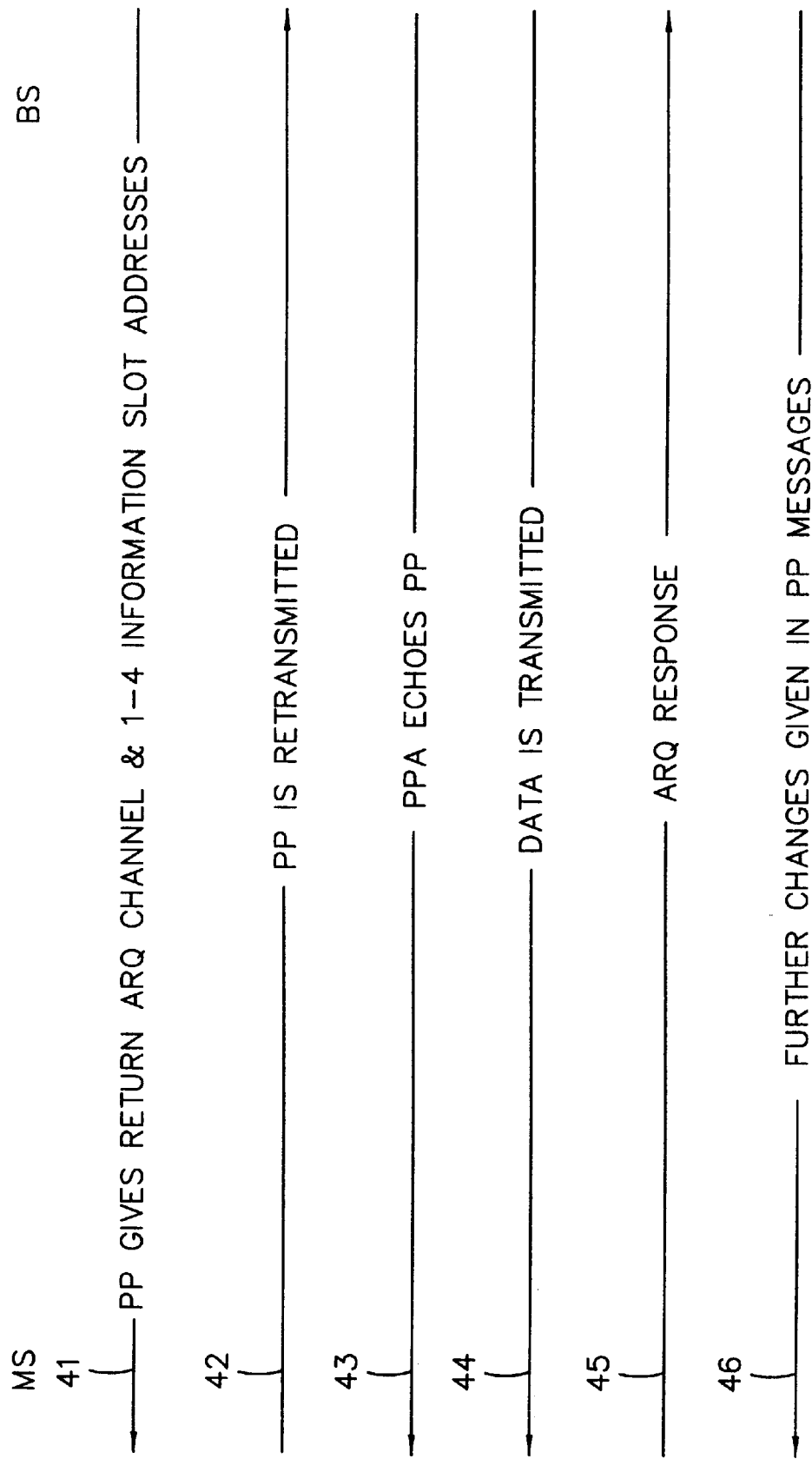
FIG. 7b illustrates a timing aspect of the messages of FIG. 7a, FIG. 8 illustrates a timing aspect of messages in asymmetric transmission resource sharing according to a preferred embodiment of the invention.

A downlink non-realtime data transmission differs from what was explained above and is illustrated in FIGS. 7a and 7b. When the base station subsystem wishes to transmit non-realtime data for the mobile station, it first transmits, according to arrow 41, a PP message containing information of the location of the slot or slots reserved to an uplink acknowledgement channel in uplink superframes, as well as of the location of the first slots reserved for the data to be transmitted in the downlink superframes. Arrow 42 illustrates the retransmission of the same PP message. When the mobile station notifies in a PPA message according to arrow 43 that it is ready for reception, the base station subsystem transmits the data in the previously informed slots according to arrow 44. The mobile station sends a positive or negative ARQ response 45 of the received data, which response may also contain measuring results used for downlink power regulation or similar information. If the location or amount of the downlink slots is changed, the base station subsystem notifies the mobile station to that effect, according to arrow 46. The transmission ends when the base station subsystem has transmitted all of the desired data and received a positive response. Naturally the transmission may end prematurely, if interference cuts the connection or the mobile station moves to an area covered by some other base station.

Figure 7B:
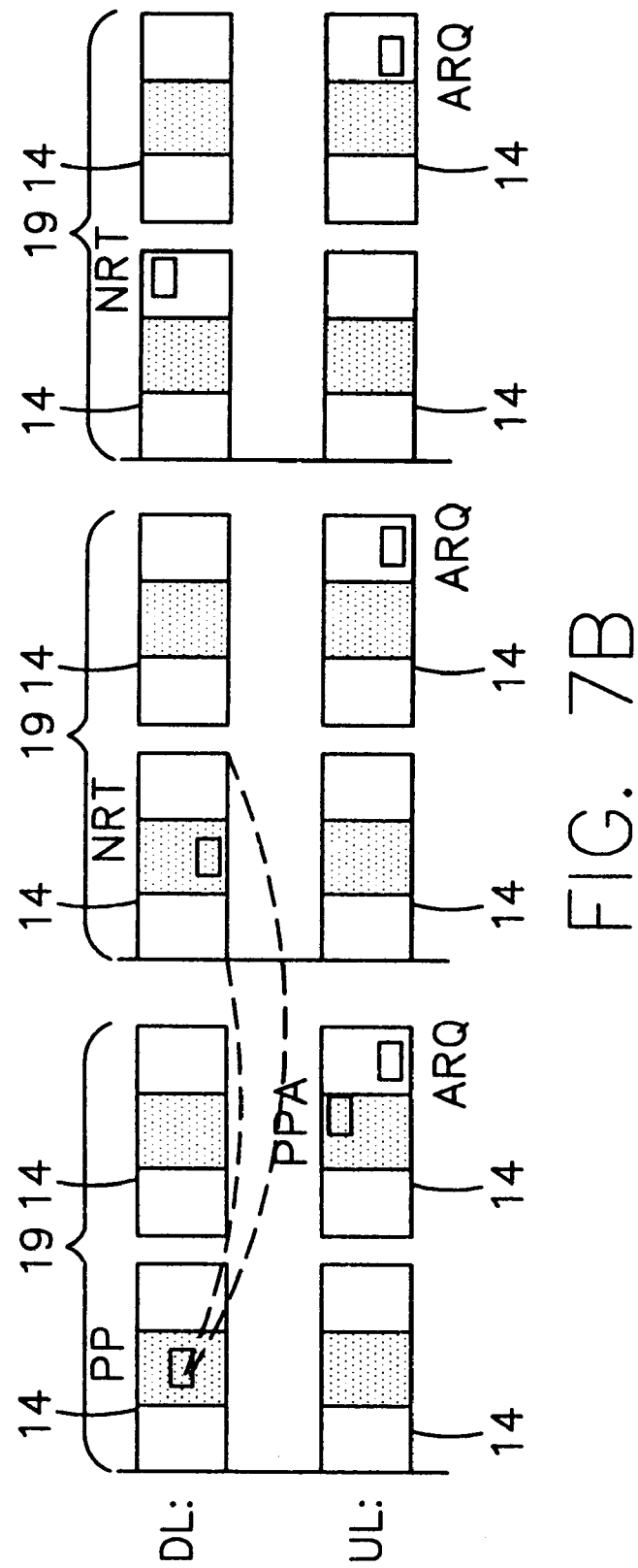

In FIG. 7b the downlink non-realtime transmission starts with a PP message sent by the base station in a PP slot of a certain downlink frame. The mobile station responds by sending, in a PPA slot identified in the PP message, a PPA message and optionally an empty ARQ message in the corresponding slot that was also identified in the PP message. The first downlink transmission will occur at earliest in the next complete downlink frame following the frame during which the base station received the mobile station's PPA message. The mobile station acknowledges the downlink NRT transmission in its ARQ replies and the process continues until the non-realtime downlink data source has been exhausted (not shown in the Figure).

In non-realtime connections there can be applied the same principle of parallel connections that was explained above, in the description of realtime services. However, because the radio resource control method according to the invention aims at a situation where up to all otherwise free slots can be temporarily allocated to a given non-realtime connection, the concept of parallel connections is not as important for non-realtime services as it is for realtime services. In the case of non-realtime services, a non-realtime data transmission task can generally be finished before starting the next.

The invention does not require that the radio transmission capacities in uplink and downlink transmission should be equal as suggested by the graphlucal layout of FIGS. 4b, 5b, 6b and 7b. On the contrary, the invention allows the base station subsystem (or a corresponding arrangement responsible for the division of radio resources) to allocate slots from the uplink frames for downlink traffic or vice versa For example in teleshopping, electronic newspaper services and WWW (World Wide Web) browsing the need for downlink capacity is far greater that the need for uplink capacity, which could result in unbalanced resource usage if the system capacities in uplink and downlink could not be made asymmetrical dynamically.

When the slot allocation routine has decided to allocate an uplink slot to downlink traffic the base station subsystem simply tells the mobile station in a PP message that the slot it should receive is in uplink domain (for example, on uplink frequency) instead of the usual downlink. In the opposite situation, in which a downlink slot is allocated for uplink transmission, a PAG message (in realtime services) or an NC message (in non-realtime services) from the base station subsystem allows the mobile station to use a certain nominally downlink slot or slots for its uplink transmission. It has to be noted, however, that changing the transmission direction in the middle of a superframe requires a guard interval in between, the length of which is equal to two times the maximum propagation delay in the cell. It is therefore advisable to group the slots into compact blocks that contain only slots in one and the same transmission direction, in order not to waste time in multiple consecutive transmission direction changes. If the coverage area of a certain base station is so small that the length of the guard interval is negligible, this restriction may be somewhat relieved.

Figure 8:
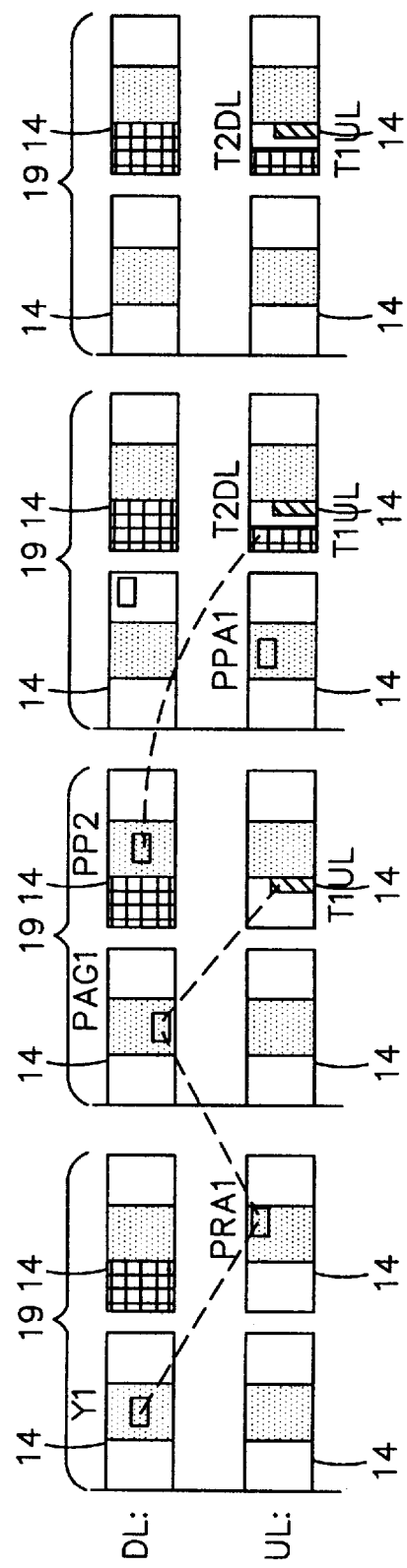

FIG. 8 illustrates the exchange of transmissions on the downlink frequency band DL and uplink frequency band UL when some uplink transmission capacity is reserved for realtime downlink use. The graphical conventions are the same as in FIGS. 4b, 5b, 6b and 7b, except that an additional crossed hatch now denotes a portion of the frames received for downlink use and an inclined hatch denotes a portion of the frames received for uplink use. During the first superframe period the base station transmits in a Y slot Y1 a message that tells the mobile station the location of PRA slots PRA1 in the next complete uplink frame. The mobile station uses the PRA opportunity to transmit a PRA message that reaches the base station and results in a PAG message PAG1 in the next complete downlink frame. The PAG message allocates a slot T1UL (or a group of slots) to the mobile station. From that moment on until the exhaustion of the uplink realtime data source (not shown in the Figure) the mobile station uses this allocation regularly in each superframe to transmit its realtime data.

In the second frame of the second superframe the base station transmits a PP message PP2 indicating its willingness to transmit realtime downlink data to the mobile station. The PP message PP2 identifies a slot (or a group of slots) T2DL from the second frame in each following uplink superframe. The mobile station transmits its PPA answer PPA2 in the next complete uplink frame, after which the base station starts using the identified (cross-hatched) portion T2DL of the uplink superframes for a downlink realtime transmission. The uplink frequency band UL is now effectively time-division duplexed (TDD). When the downlink transmission using the slot T2DL ends (not shown in the Figure), the uplink frequency band may return to a purely uplink state or the base station subsystem may allocate uplink capacity to another downlink transmission. Naturally there may be a multitude of simultaneous uplink and downlink connections in use, in the setup phase, or in the teardown phase, but for graphical clarity these are not shown in the Figures.

Next we shall consider some further duplexing aspects. One alternative is to arrange the uplink and downlink transmission in each cell according to time division duplex (TDD). In that case the transmission is not chronologically continuous in either of the directions, but transmissions in the two directions alternate on a frame basis during each superframe. Only one frequency band, common for both the uplink and downlink directions, is needed in the cell. If the users use a radio connection controlled according to the method of the present invention for browsing the www (World Wide Web) or for another similar purpose, where the data transmission need in one direction is manifold compared to the other direction (in www-browsing the volume of the downlink data transmission is 7–15 times the volume of the uplink data transmission), the time division duplex can be arranged so that in each superframe, X consecutive downlink frames are followed by Y consecutive uplink frames (or Y consecutive uplink frames are followed by X consecutive downlink frames), where the relation of the integrals X and Y is X>Y. Still further, the cross-allocation scheme explained previously may be introduced so that even if there is a predetermined (fixed or dynamically changing) number of frames for each transmission direction, the base station subsystem may allocate downlink slots for uplink transmissions or vice versa.

Figure 9:
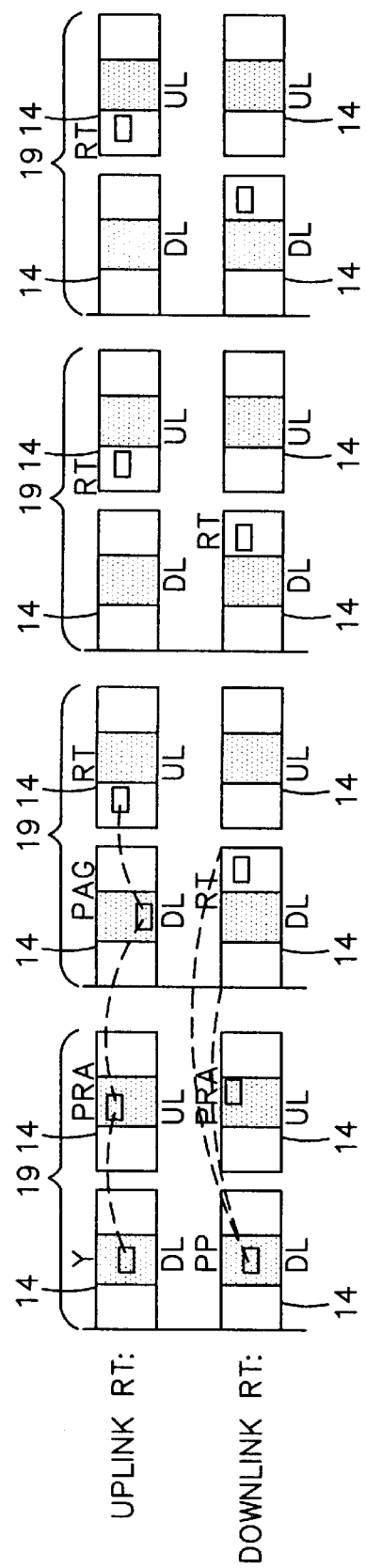
FIG. 9 illustrates full TDD operation according to the invention.
Figure 9:
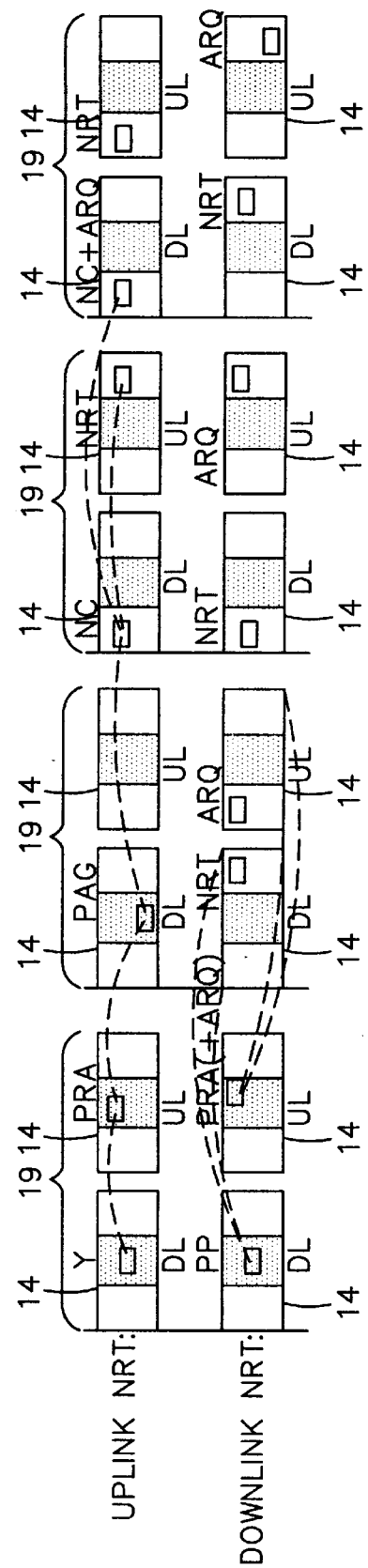

FIG. 9 illustrates the exchange of transmissions in fully time-division duplexed operation with all four possible combinations of uplink, downlink, realtime and non-realtime. Each row in the Figure represents a single frequency band that is used (here: symmetrically) for both uplink and downlink transmission. A superframe 19 consists of two frames 14, the first of which is for downlink (DL) and the second is uplink (UL). The shaded portion of each frame contains control slots. On the top row (Uplink RT) the mobile stations finds in a Y slot downlink transmission the slot addresses of the next available PRA slots, which are in the uplink frame of the same superframe. It transmits a PRA message and receives in the next downlink frame a PAG message allocating a slot from the uplink frame. Thereafter the mobile station uses this regularly occurring slot for uplink realtime transmission. On the second row (Downlink RT) the base station transmits a PP message that identifies a downlink information slot from the next complete downlink frame on. The mobile station responds with a PPA message, whereafter the downlink realtime transmission commences.

On the third row (Uplink NRT) of FIG. 9, the mobile station transmits a PRA message after having found a correct PRA slot address in a received Y slot message. In the downlink frame of the next superframe the base station sends a PAG message that identifies an NRT control slot (NC) from the downlink frame of the third superframe. In the first NC slot the base station then transmits a message in which it gives an address for a downlink ARQ slot as well as the addresses for the first granted uplink NRT traffic slots. The first one(s) of the granted uplink NRT traffic slots may be in the uplink frame of the same superframe at earliest. The mobile station starts transmission in the allocated NRT traffic slots and the base station acknowledges the transmissions with ARQ messages and grants further uplink NRT traffic slots in the following NC slots. On the last row (Downlink NRT) the downlink non-realtime transmission starts with a PP message sent by the base station in a PP slot. The mobile station responds by sending, in a PPA slot identified in the PP message, a PPA message and optionally an empty ARQ message in the corresponding slot that was also identified in the PP message. The first downlink transmission will occur at earliest in the downlink frame of the next superframe. The mobile station acknowledges the downlink NRT transmission in its ARQ replies and the process continues until the non-realtime downlink data source has been exhausted (not shown in the Figure).

The radio resources control method according to the invention also offers a possibility for regulating the transmission power during radio connection. Above we referred to the fact that the control slots contained in the superframes form one or several logic control channels. One two-way logic channel per connection can be called a SCCH channel (system control channel), which in a preferred embodiment of the invention comprises, per each active connection, one slot (in the above given time-frequency space example one 200 kHz slot) per sixteen superframes both in the uplink and downlink directions. The SCCH channel is used for the whole duration of the active data transmission period, and it can be employed for instance for transmitting measurements relating to the power level, for arranging the mutual timing of the base station subsystem and the mobile station, for transmitting information relating to a handover to a different base station and for transmitting commands directed from the base station subsystem to the mobile station. The base station subsystem may for instance command the mobile station into a so-called sleep mode, where the mobile station is inactive for a predetermined period of time in order to save power.

Figure 10:
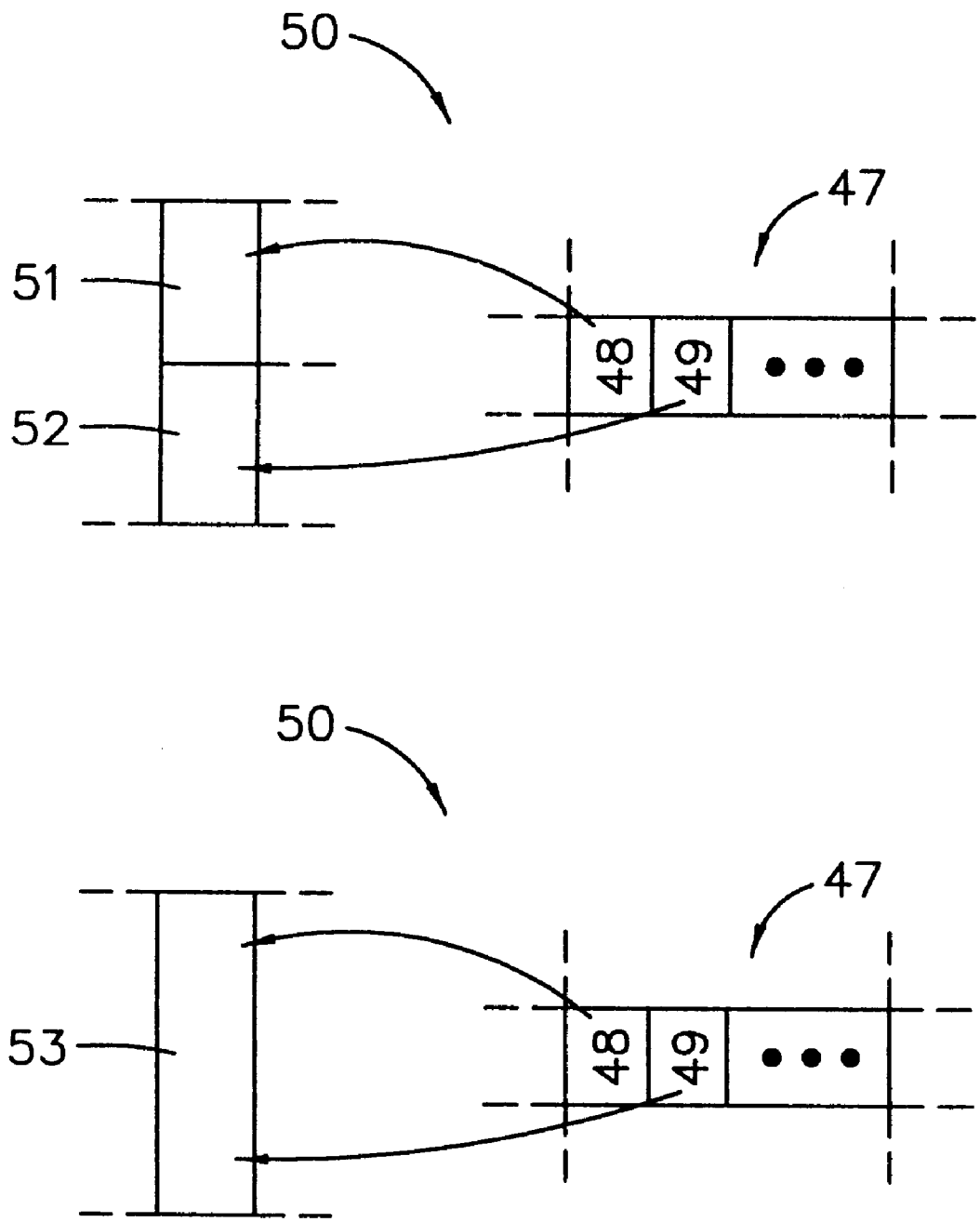
FIG. 10 illustrates a method according to the invention for regulating the transmission power.

Another possibility offered by the method according to the invention for regulating the power level of mobile stations is a public power control channel (PPCC) independent of the slot division in the frames. In order to realise it, each downlink frame comprises a given PPCC slot containing a given amount of power control bits per each possible slot in the corresponding uplink frame. The amount of power control bits in the PPCC slot can be chosen so that if the respective frame would be altogether composed of the smallest possible slots, each slot would have its own bits. When the frame in practice contains larger slots, too, in the controlling of each larger slot there are used all those bits of the PPCC slot that refer to the area of the larger slot. This arrangement is illustrated in FIG. 10. The PPCC slot 47 comprises the first power control bits 48 and the second power control bits 49. If the corresponding uplink frame 50 would comprise only small slots 51 and 52, the first power control bits 48 would control the first slot 51 and the second power control bits 49 would control the second slot 52. If the small slots in the uplink frame are modularly replaced by a larger slot 53, the power control bits 48 and 49 control the same slot 53, which brings either more resolution or redundance to the control. Thus the structure of the PPCC slot can be independent of the slot structure of the frames in the uplink channel. A similar control channel structure and principle can also be applied in other types of radio resource control connected to the superframe. For example, the point of time of the transmission of each slot can be controlled by a similar procedure.

The slot allocation principles that were presented previously may be applied also to the existing TDMA systems like the GSM system or the IS-136 system to increase the data transmission capacity of a given radio connection. The size of an allocated slot in a single frequency band will come bigger in the chronological direction if several consecutive slots of each cyclically repeated frame are given to a single connection. Alternatively or additionally the connection may get slots from both uplink and downlink frames, without the limitation that uplink frame slots should be for uplink use only and downlink frame slots for downlink use only. This means that the newly allocated larger slot would actually consist of at least two separate areas in the time-frequency space, with a forbidden separator frequency band separating the nominal "uplink" and "downlink" frequencies in a manner known as such from prior art.

In the specification above, we have described a method for controlling radio resources with reference to a few preferred embodiments. It is obvious for a man skilled in the art that the explained examples are not meant to be restrictive, but the invention can, according to ordinary professional skills, be modified within the scope of the appended patent claims.

We claim:

1. A method for controlling physical radio resources in a radio system comprising a base station subsystem and several mobile stations in radio connection thereto, comprising the steps of:

dividing the physical radio resources into chronologically consecutive frames, said frames containing two-dimensional integral slots having varying data transmission capacities, sizing each integral slot to represent a given share of the physical resources contained in the frame, and separately allocating each slot to the use of a given radio connection.

2. A method according to claim 1, wherein the slots contained in the frame belong, according to the volume of the respective physical radio resources, to at least two different allowed size categories, and that in order to change the slot structure of a frame, a predetermined integral number of the slots of a first size category can be replaced by a predetermined integral number of the slots of a second size category.

3. A method according to claim 2, wherein the amount of allowed size categories is three, with the slot of the largest size category being equal to two slots of the next largest size category or to ten slots of the smallest size category.

4. A method according to claim 2, wherein the amount of allowed size categories is four, with the slot of the largest size category being equal to two slots of the next largest size category, four slots of the third largest size category or eight slots of the smallest size category.

5. A method according to claim 1, wherein a first dimension of the slots is time and a second dimension of the slots is one of the following: time, frequency, code.

6. A method according to claim 5, wherein each frame is divided, in the direction of a first dimension, into a predetermined amount of time slots, and each time slot is further divided into slots.

7. A method according to claim 6, wherein time-time-division is applied, such that each slot occupies the whole frequency range of the corresponding time slot and the length of each slot in the time dimension depends on its data transmission capacity.

8. A method according to claim 6, wherein time-frequency division is applied, such that each slot occupies the whole chronological duration of the corresponding time slot and the width of each slot in the frequency dimension depends on its data transmission capacity.

9. A method according to claim 6, wherein time-code division is applied, such that each slot occupies the whole chronological duration of the corresponding time slot and the data transmission capacity of each slot depends on the corresponding spreading code.

10. A method according to claim 1, wherein a predetermined non-negative integral number of consecutive frames form a superframe, and in consecutive superframes, the frames that are located in similar positions when starting from the beginning of the superframe correspond to each other with respect to the slot division, if changes have not occurred in the data transmission need of the radio connections in between the superframes.

11. A method according to claim 10, wherein each superframe contains both slots meant for transmission of information and control slots for realizing logic control channels.

12. A method according to claim 11, wherein a downlink signal comprises a general logic control channel provided for the signalling connected to slotwise radio resource control.

13. A method according to claim 11, wherein the slots contained in the frame belong, according to the volume of the respective physical radio resources, to at least two different allowed size categories, and each control slot belongs, according to the physical radio resources represented thereby, to one of the allowed size categories.

14. A method according to claim 1, wherein a predetermined frequency band is used to convey both downlink slots and uplink slots according to a time-division duplexing scheme.

15. A method according to claim 14, wherein a predetermined non-negative integral number of consecutive frames forms a superframe and each superframe contains a first number of downlink frames and a second number of uplink frames.

16. A method according to claim 14, wherein a predetermined first frequency band is used to convey nominally downlink slots and a predetermined second frequency band is used to convey nominally uplink slots, and in response to unsymmetrical traffic conditions in the uplink and downlink directions, slots are cross-allocated so that nominally downlink slots are used to convey uplink traffic or nominally uplink slots are used to convey downlink traffic.

17. A method according to claim 1, wherein the base station subsystem maintains a reservation table in order to indicate the size and state of occupancy of the slots in the frames and to maintain an optimal rate of usage.

18. A method according to claim 17, wherein the base station subsystem makes a decision of allocating the slots for the radio connections on the basis of the data transmission needs of the radio connections,
the changes in the data transmission needs of the radio connections, and
the size and state of occupancy of the slots indicated by the reservation table.

19. A method according to claim 18, wherein the base station subsystem evaluates the quality of at least one allocatable slot and makes a decision of allocating or non-allocating said slot to a connection on the basis of the transmission quality required by said connection.

20. A method according to claim 18, wherein the base station subsystem performs the steps in which, as a response to a slot request, either uplink or downlink frame storage is chosen,
a frame storage is chosen,
a set of candidate time slots from the chosen frame storage is formed,
a set of predetermined selection criteria is applied to find the best candidate time slot,
the transmission quality offered by the selected best candidate time slot is checked, and
a decision to allocate a slot from the best candidate time slot is made.

21. A method according to claim 18, wherein the base station subsystem makes a decision of allocating the slots for the radio connections also on the basis of the information contained in the reservation tables of neighbouring base station subsystems.

22. A method according to claim 21, wherein the base station subsystem allocates slots on the basis of the transmission power used for communication by different mobile stations, and a first mobile station that uses low transmission power to communicate with a first base station is allocated a slot that coincides chronologically with a slot allocated to a second mobile station that uses high transmission power to communicate with a second base station.

23. A method according to claim 21, wherein the base station subsystem allocates slots on the basis of the communication type used by different mobile stations, and circuit-switched and packet-switched connections have their own slots located in the reservation tables of adjacent base stations in optimal locations with respect to the total interference of the system.

24. A method for setting up an uplink radio connection between a base station subsystem and a mobile station in a radio system comprising a base station subsystem and several mobile stations, in which radio system the physical radio resources are divided into chronologically consecutive frames, wherein the method comprises the steps of:

dividing said frames into two-dimensional integral slots having varying data transmission capacities, transmitting from the mobile station, in an allowed uplink capacity request slot, a capacity request (21, 35), where the mobile station indicates the amount of physical radio resources required by the uplink radio connection, and making an allocation decision in the base station subsystem as to the data transmission capacities of said two-dimensional integral slots in response to said capacity request.

25. A method according to claim 24, wherein the location and amount of the allowed uplink capacity request slots in relation to the frame structure is not constant and the base station subsystem transmits, in a predetermined downlink slot, an announcement indicating the location and amount of the allowed uplink capacity request slots.

26. A method according to claim 24, wherein the radio system additionally offers the mobile station realtime and non-realtime data transmission services, and in order to reserve radio resources for the use of a radio connection for uplink realtime data transmission services, the mobile station indicates in its capacity request the required data transmission capacity in the form of at least one slot size, and a predetermined set of parameters describing the required qualities of the radio connection.

27. A method according to claim 26, wherein when the data transmission capacity demand grows during an ongoing radio connection for uplink realtime data transmission services, the mobile station sends the base station subsystem a capacity request indicating the required additional data transmission capacity in the form of at least one slot size.

28. A method according to claim 26, wherein when the data transmission capacity demand diminishes during an ongoing radio connection for uplink realtime data transmission services having several allocated slots, the mobile station leaves at least one of the allocated slots unused.

29. A method according to claim 26, wherein each mobile station has a certain temporary logic identifier in order to distinguish the mobile station from other mobile stations operating under the same base station subsystem, and in order to reserve radio resources for the use of a radio connection for parallel uplink realtime data transmission services, the mobile station sends the base station subsystem a capacity request comprising:

a temporary logic identifier for said mobile station, the required parallel data transmission capacity in the form of at least one slot size, a predetermined set of parameters describing the required qualities of the parallel radio connection, and an additional identifier, which distinguishes the parallel radio connection from other ongoing radio connections conveying realtime data transmission services.

30. A method according to claim 24, wherein the radio system additionally offers the mobile station realtime and non-realtime data transmission services, and in order to reserve radio resources for the use of a radio connection for uplink non-realtime data transmission services, the mobile station indicates in its capacity request:

the amount of data to be transmitted, and a predetermined set of parameters describing the required qualities of the radio connection.

31. A method according to claim 24, wherein in its allocation decision the base station subsystem has the freedom of directing the required radio connection into any available slot and after the allocation decision the base station subsystem transmits to the mobile station in a predetermined downlink access granting slot an indication of the granted slot or slots.

32. A method for setting up a downlink radio connection between a base station subsystem and a mobile station in a radio system comprising a base station subsystem and several mobile stations, in which radio system the physical radio resources are divided into chronologically consecutive frames, said method comprising the steps of:

dividing said frames into two-dimensional integral slots having varying data transmission capacities, making an allocation decision in the base station subsystem as a response to the detected need of a new downlink radio connection indicating the amount of physical radio resources required by the new downlink radio connection, transmitting from the base station subsystem to the mobile station a paging message, that announces the location of the downlink slot or slots allocated to the new downlink radio connection in said allocation decision, as a response to a detected paging message, transmitting from the mobile station a paging acknowledgement message, and as a response to a detected paging acknowledgement message, commencing downlink transmission from the base station subsystem.

33. A method according to claim 32, wherein the radio system additionally offers the mobile station realtime and non-realtime data transmission services, and in order to form a radio connection for downlink realtime data transmission services, the base station subsystem indicates in the paging message, for the regularly repeated slots allocated to the radio connection, their location in relation to the frame structure.

34. A method according to claim 33, wherein when the data transmission capacity demand grows during an ongoing radio connection for downlink realtime data transmission services, the base station subsystem makes an additional slot allocation decision and sends the mobile station a paging message, that announces the location of the additional downlink slot or slots allocated to the radio connection.

35. A method according to claim 33, wherein when the data transmission capacity demand diminishes during an ongoing radio connection for downlink realtime data transmission services having several allocated slots, the base station makes a slot deallocation decision concerning at least one of the allocated slots and leaves the corresponding slots unused.

36. A method according to claim 33, wherein each mobile station has a given temporary logic identifier in order to distinguish the mobile station from other mobile stations operating under the same base station subsystem, and in order to reserve radio resources for the use of a radio connection for parallel downlink realtime data transmission services, the base station subsystem sends the mobile station a paging message indicating:

the temporary logic identifier of the mobile station, the location of the regularly repeated slots allocated to the parallel radio connection, and an additional identifier, which distinguishes the parallel radio connection from other ongoing radio connections conveying realtime data transmission services.

37. A method according to claim 32, wherein the radio system additionally offers the mobile station realtime and non-realtime data transmission services, and in order to form a radio connection for downlink non-realtime data transmission services, the base station subsystem indicates in the paging message the location of the first slots for non-realtime data transmission services in relation to the frame structure, and to announce a change in either the location or the amount of the slots allocated for non-realtime data transmission services during the connection, the base station subsystem notifies of the new location or amount of the slots by sending a new paging message.

38. A base station subsystem for a radio telecommunication system having base station subsystems and mobile stations which respectively communicate information over radio connections, said base station subsystem comprising:

means for arranging the communicated information into chronologically consecutive frames, and means for directing the communicated information of each radio connection into at least one cyclically repeated two-dimensional integral slot in the frames, the size of said one slot in relation to the size of a frame being dependent on the data transmission capacity required by the respective radio connection.

39. A base station subsystem according to claim 38, further comprising means for maintaining a reservation table in order to indicate the size and state of occupancy of the slots in the frames and maintain an optimal rate of usage.

40. A base station subsystem according to claim 39, further comprising means for communicating information concerning reservation tables with its neighbouring base station subsystems.

41. A base station subsystem according to claim 38, further comprising means for setting up uplink connections comprising:

means for producing a general access slot location announcement and transmitting it to all of the telecommunication system's mobile stations in a predetermined downlink slot in order to advise the mobile stations to send capacity requests in the announced access slot, means for receiving and interpreting capacity requests from the mobile stations, means for making slot allocation decisions that allocate slots to radio connections requested and identified in the capacity requests, and means for producing access granting messages and transmitting them in a predetermined slot selectively to those mobile stations the capacity requests of which were granted in the slot allocation decisions.

42. A base station subsystem according to claim 38, further comprising means for setting up downlink connections comprising:

means for producing paging messages and transmitting them in a predetermined slot selectively to those mobile stations to which a downlink connection is to be established, said paging messages indicating at least one allocated downlink slot, means for receiving and interpreting paging acknowledgement messages from the mobile stations, and means for directing a downlink transmission into the allocated downlink slots indicated in the paging messages.

43. A mobile station for a radio telecommunication system having base station subsystems and mobile stations, which respectively communicate information over radio connections, said mobile station comprising:

means for arranging the communicated information into chronologically consecutive frames, and means for directing the communicated information of each radio connection into at least one cyclically repeated two-dimensional integral slot in the frames, the size of said integral slot in relation to the size of a frame being dependent on the data transmission capacity required by the respective radio connection.

44. A mobile station according to claim 43, further comprising means for setting up uplink connections comprising:

means for receiving and interpreting access slot location announcements transmitted from a base station subsystem, means for producing a capacity request and transmitting it in an access slot identified in an access slot location announcement, means for receiving and interpreting an access grant message from the base station subsystem identifying at least one granted slot, and means for directing information transmissions into said at least one identified granted slot.

45. A mobile station according to claim 43, further comprising means for setting up downlink connections comprising:

means for receiving and interpreting paging messages transmitted from a base station subsystem, said paging messages indicating at least one allocated downlink slot and at least one acknowledgement slot, means for producing a paging acknowledgement message and transmitting it in an acknowledgement slot identified in an access slot location announcement, and means for receiving and interpreting downlink transmissions in said at least one allocated downlink slot.

46. A radio telecommunication system having base station subsystems and mobile stations, which respectively communicate information over radio connections and comprise:

means for arranging the communicated information into chronologically consecutive frames, and means for directing the communicated information of each radio connection into at least one cyclically repeated two-dimensional integral slot in the frames, the size of said integral slot in relation to the size of a frame being dependent on the data transmission capacity required by the respective radio connection.

* * * * *